US012630957B2

(12) United States Patent
Kwon et al.

(10) Patent No.: US 12,630,957 B2
(45) Date of Patent: May 19, 2026

(54) METHOD FOR CONTROLLING LAUNDRY TREATING APPARATUS

(71) Applicant: LG ELECTRONICS INC., Seoul (KR)

(72) Inventors: Baekeun Kwon, Seoul (KR); Joohee Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 302 days.

(21) Appl. No.: 18/249,238

(22) PCT Filed: Oct. 15, 2021

(86) PCT No.: PCT/KR2021/014298
§ 371 (c)(1),
(2) Date: Apr. 14, 2023

(87) PCT Pub. No.: WO2022/080917
PCT Pub. Date: Apr. 21, 2022

(65) Prior Publication Data
US 2023/0407544 A1      Dec. 21, 2023

(30) Foreign Application Priority Data
Oct. 15, 2020      (KR) ........................ 10-2020-0133617

(51) Int. Cl.
*D06F 34/18*          (2020.01)
*D06F 33/32*          (2020.01)
(Continued)

(52) U.S. Cl.
CPC .............. *D06F 34/18* (2020.02); *D06F 33/34* (2020.02); *D06F 33/32* (2020.02); *D06F 37/40* (2013.01);
(Continued)

(58) Field of Classification Search
CPC ...... D06F 34/18; D06F 33/34; D06F 2103/04; D06F 2103/18; D06F 2105/02;
(Continued)

(56) References Cited

U.S. PATENT DOCUMENTS

2007/0124871 A1* 6/2007 Kwon ..................... D06F 33/40
8/158
2010/0205823 A1* 8/2010 Ashrafzadeh ........... D06F 33/00
34/445
(Continued)

FOREIGN PATENT DOCUMENTS

CN          111197226 A      5/2020
JP          2001-224890      8/2001
(Continued)

OTHER PUBLICATIONS

WO2017131412 translation (Year: 2017).*
(Continued)

*Primary Examiner* — Michael E Barr
*Assistant Examiner* — Lauren G Orta
(74) *Attorney, Agent, or Firm* — Fish & Richardson P.C.

(57) ABSTRACT
The present disclosure relates to a method for controlling a laundry treating apparatus capable of sensing and calculating at least one of a volume of laundry and a material of the laundry through a camera capable of filming the laundry in a front load type washing machine.

15 Claims, 22 Drawing Sheets

(51) Int. Cl.

| | |
|---|---|
| *D06F 33/34* | (2020.01) |
| *D06F 37/40* | (2006.01) |
| *D06F 39/08* | (2006.01) |
| *D06F 103/00* | (2020.01) |
| *D06F 103/04* | (2020.01) |
| *D06F 103/06* | (2020.01) |
| *D06F 103/18* | (2020.01) |
| *D06F 103/64* | (2020.01) |
| *D06F 105/02* | (2020.01) |
| *D06F 105/48* | (2020.01) |
| *D06F 105/52* | (2020.01) |
| *H04N 7/18* | (2006.01) |

(52) U.S. Cl.
CPC ........ *D06F 39/088* (2013.01); *D06F 2103/00* (2020.02); *D06F 2103/04* (2020.02); *D06F 2103/06* (2020.02); *D06F 2103/18* (2020.02); *D06F 2103/64* (2020.02); *D06F 2105/02* (2020.02); *D06F 2105/48* (2020.02); *D06F 2105/52* (2020.02); *H04N 7/18* (2013.01); *H04N 7/183* (2013.01); *Y02B 40/00* (2013.01)

(58) Field of Classification Search
CPC .. D06F 2105/52; D06F 33/32; D06F 2103/00; D06F 2103/06; D06F 2103/64; D06F 2105/48; D06F 37/40; D06F 39/088; Y02B 40/00; H04N 7/183; H04N 7/18
See application file for complete search history.

(56) References Cited

U.S. PATENT DOCUMENTS

| | | | |
|---|---|---|---|
| 2014/0326067 A1 | 11/2014 | Chanda et al. | |
| 2016/0305058 A1 | 10/2016 | Leitert et al. | |
| 2019/0169780 A1* | 6/2019 | Chen .................. | G05B 19/0426 |
| 2020/0018005 A1 | 1/2020 | Lee | |

FOREIGN PATENT DOCUMENTS

| | | | | |
|---|---|---|---|---|
| KR | 10-0519325 | | 11/2005 | |
| KR | 10-2016-0039872 A | | 4/2016 | |
| KR | 10-2017-0090164 | | 8/2017 | |
| KR | 20170090164 A * | | 8/2017 | ............... F24C 7/08 |
| WO | WO-2017131412 A1 * | | 8/2017 | ............. H04N 23/00 |

OTHER PUBLICATIONS

KR20170090164 translation (Year: 2017).*
Extended European Search Report in European Appln. No. 21880564.6, mailed on Oct. 9, 2024, 9 pages.
International Search Report and Written Opinion in International Appln. No. PCT/KR2021/014298, mailed on Feb. 4, 2022, 9 pages.

\* cited by examiner

[Fig. 1]
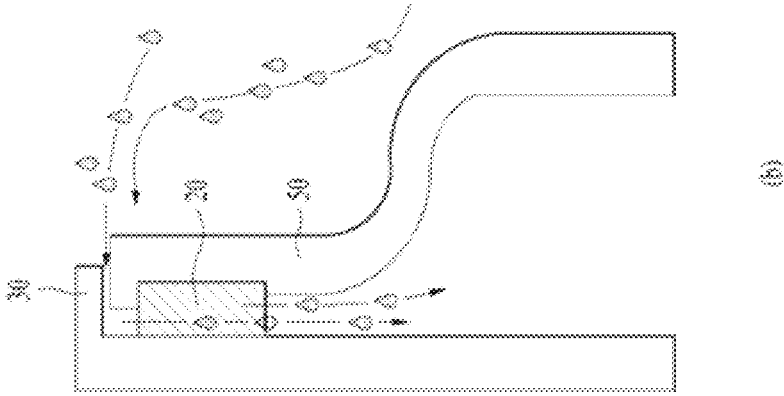
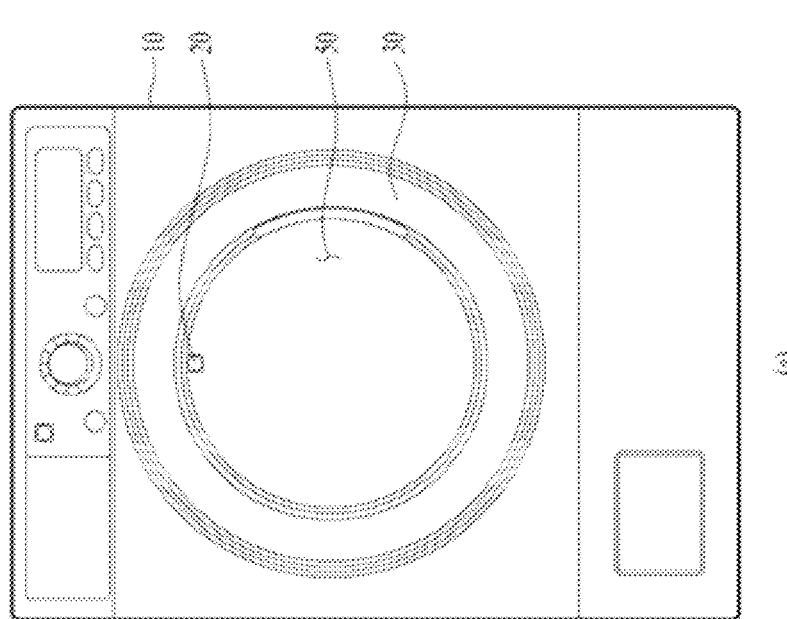

[Fig. 2]
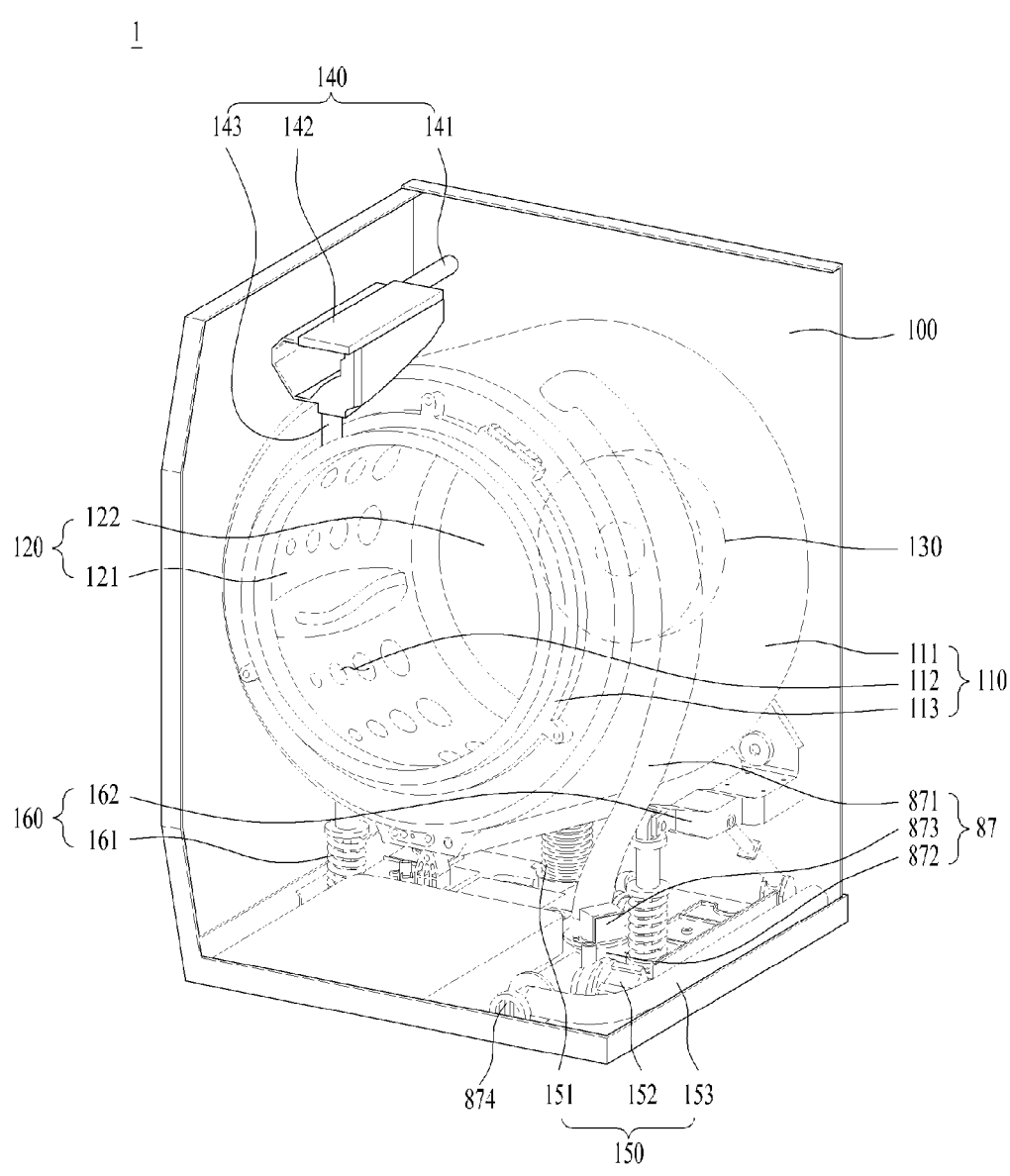

[Fig. 3]
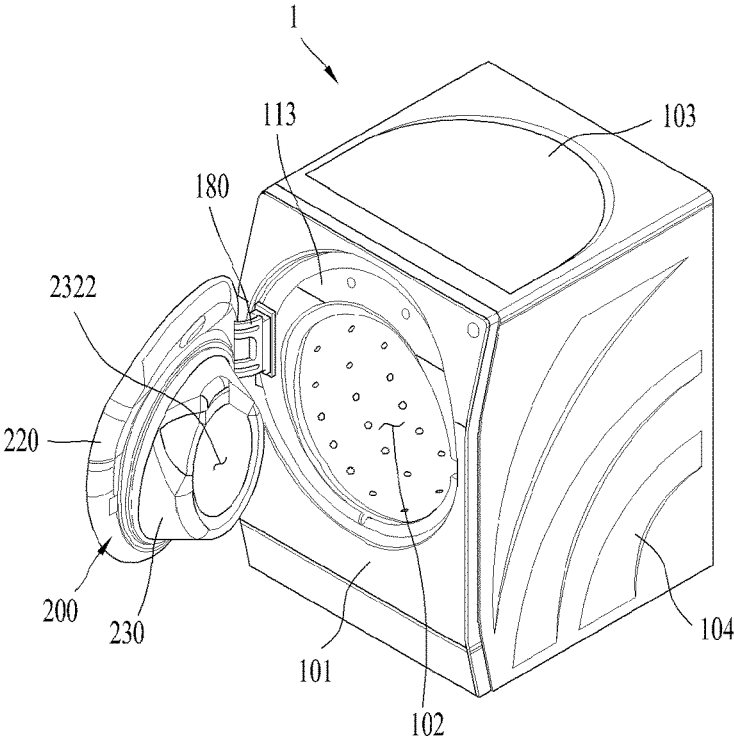
[Fig. 4]
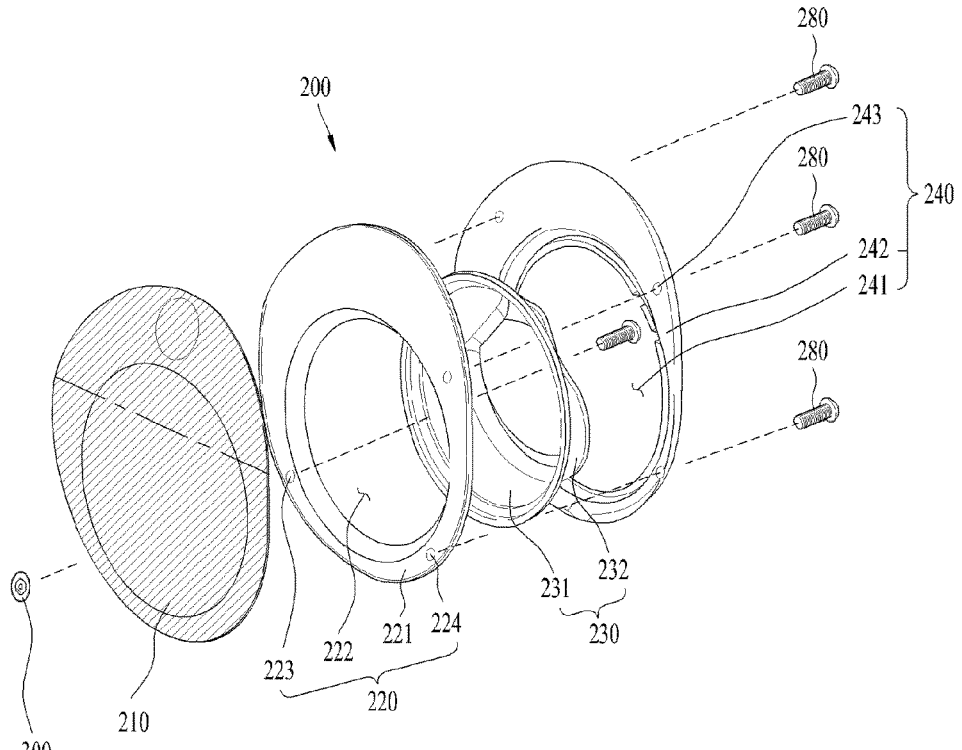

[Fig. 5]
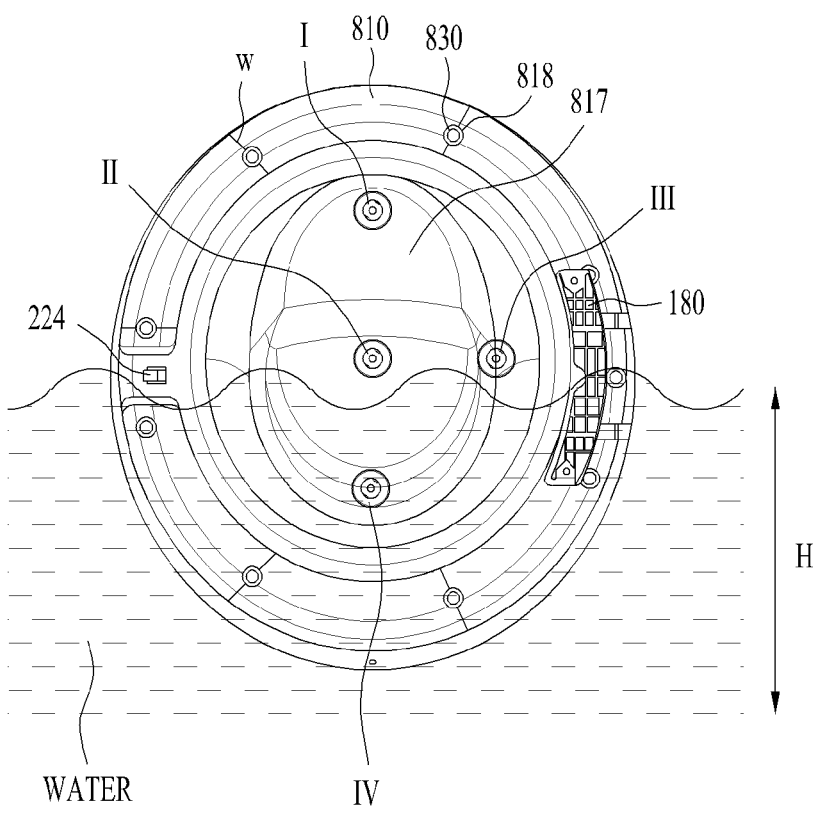

[Fig. 6]
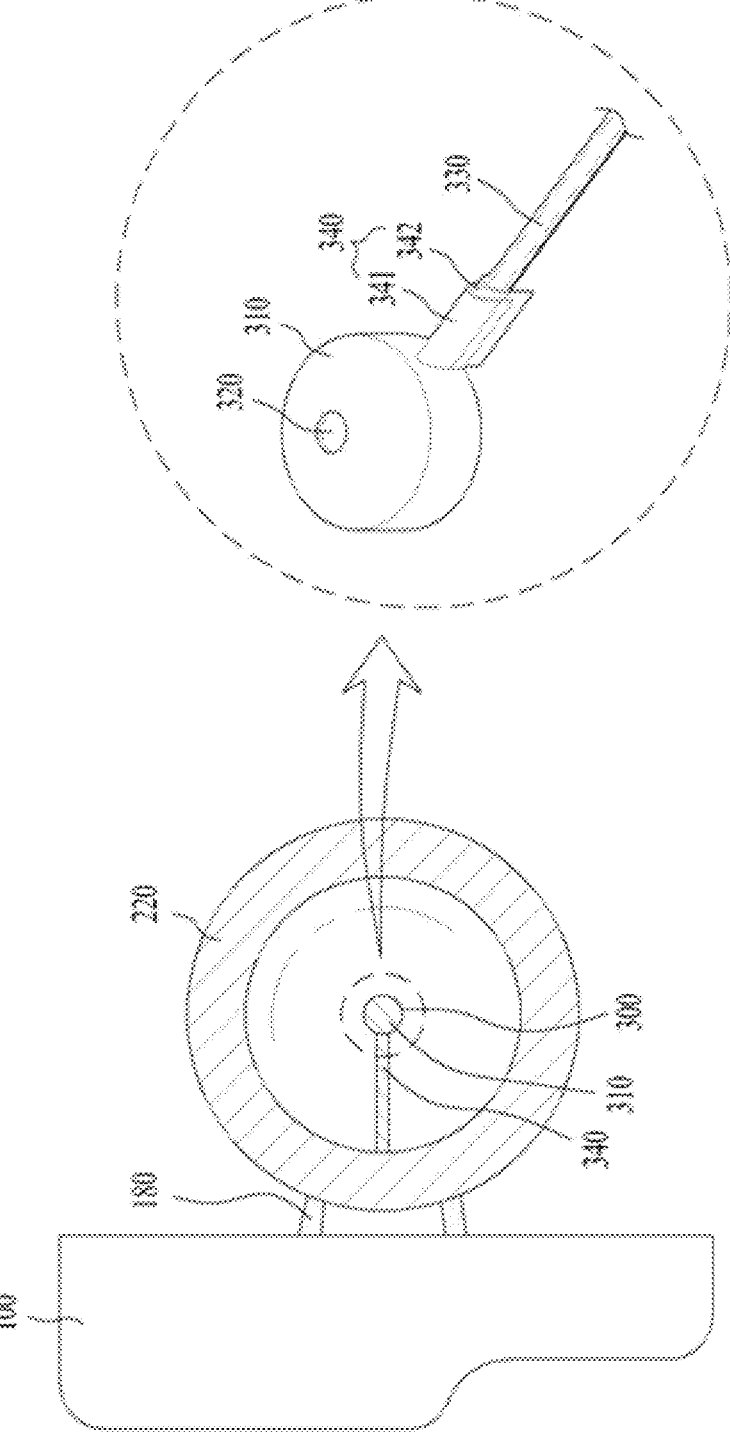

[Fig. 7]
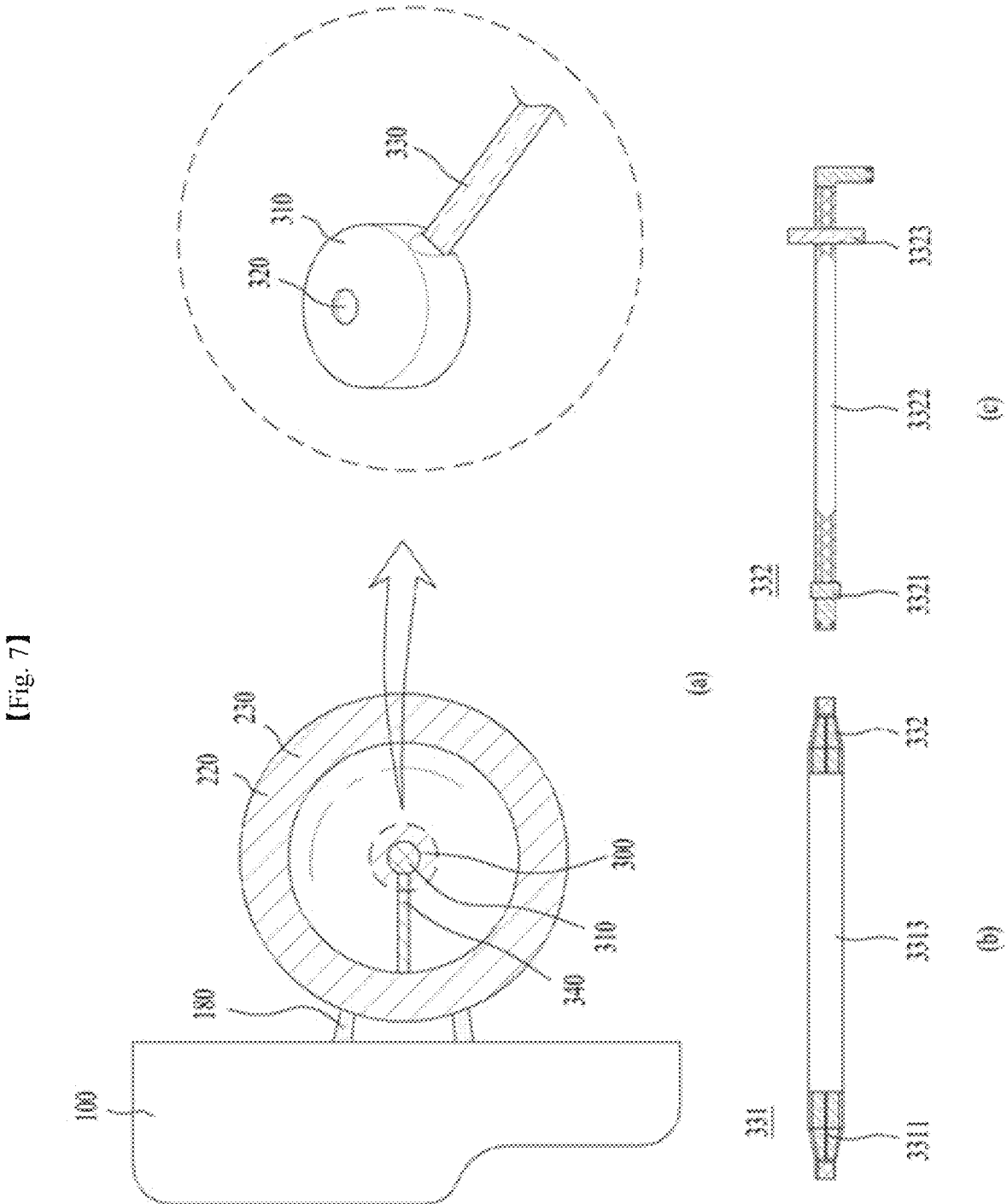

[Fig. 8]
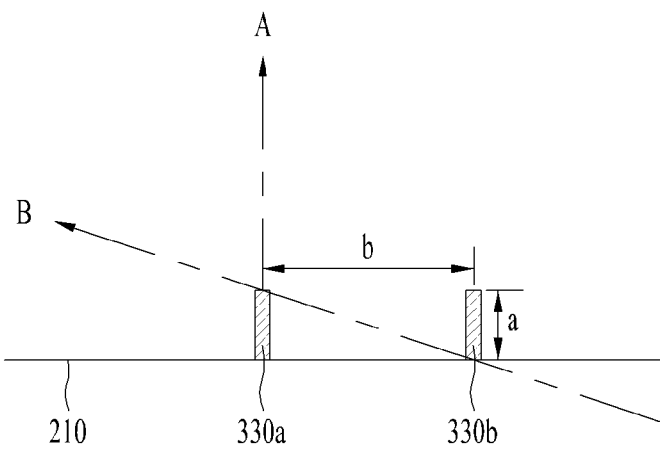

[Fig. 9]
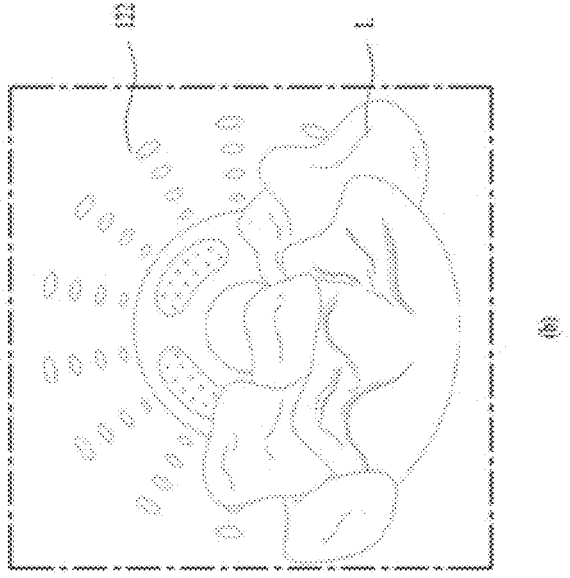
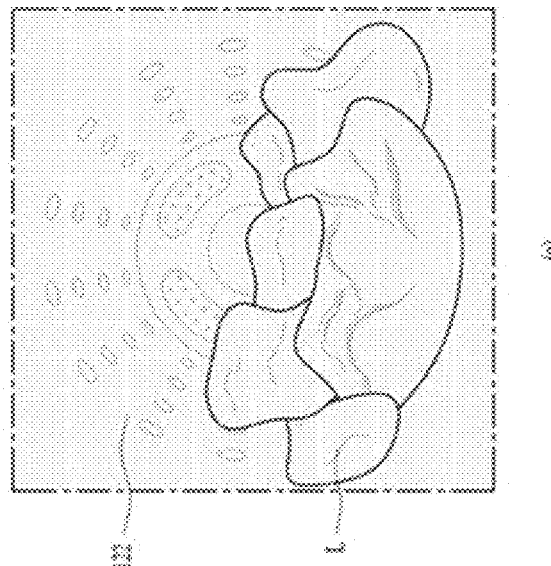

[Fig. 10]
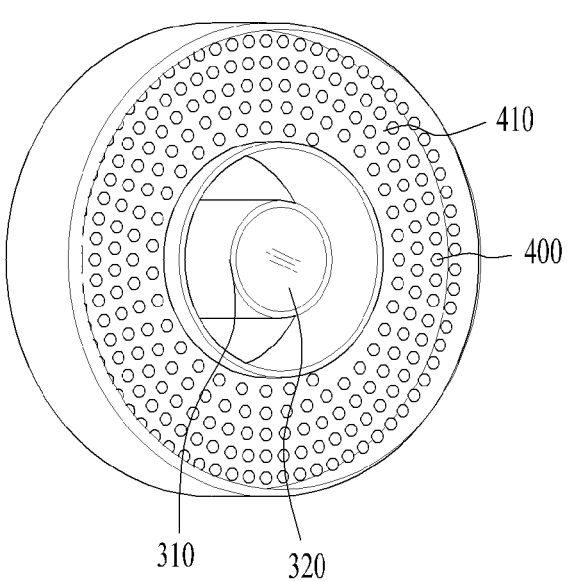

[Fig. 11]
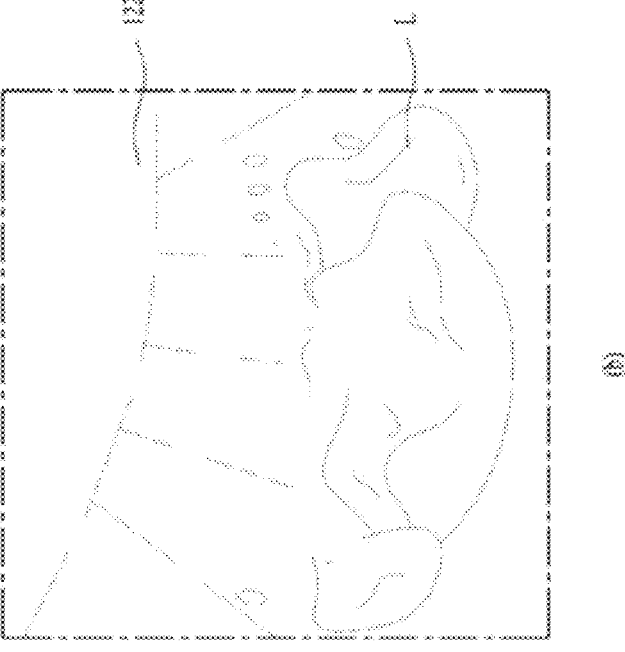
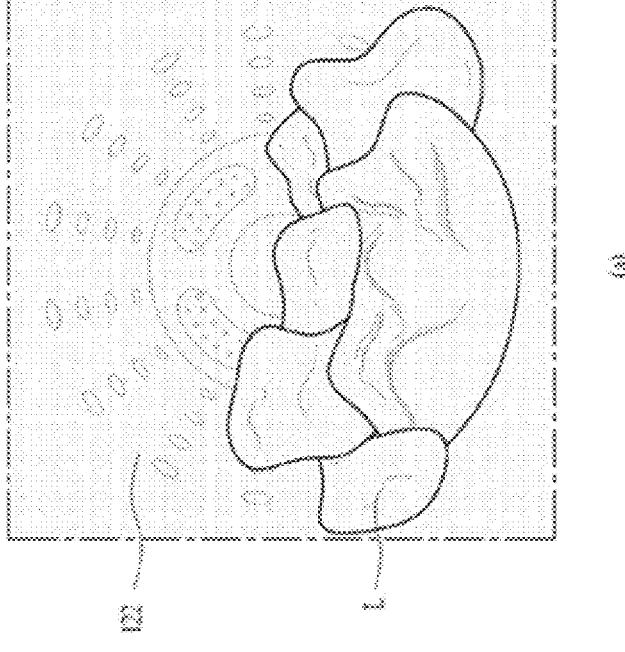

[Fig. 12]
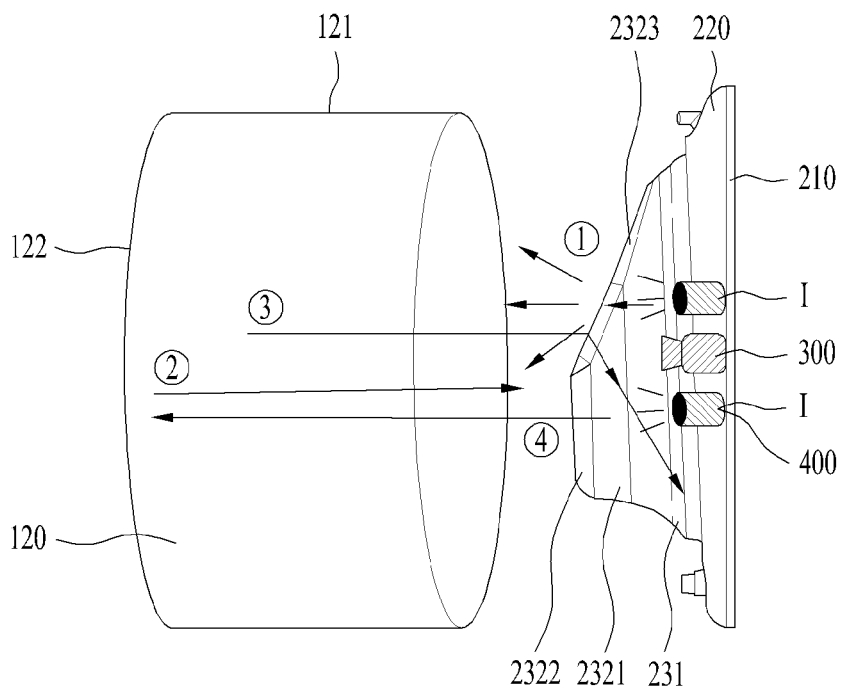
[Fig. 13]
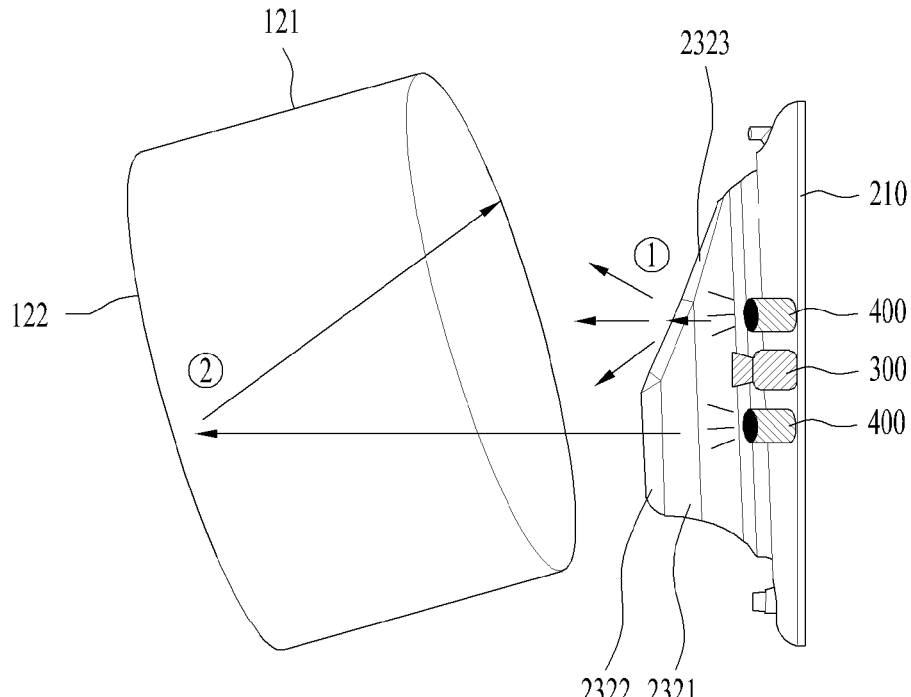

[Fig. 14]
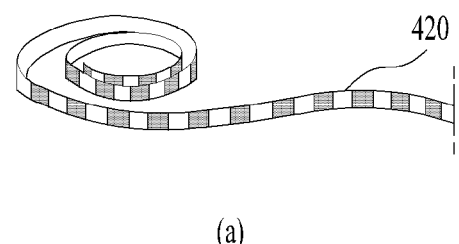
(a)
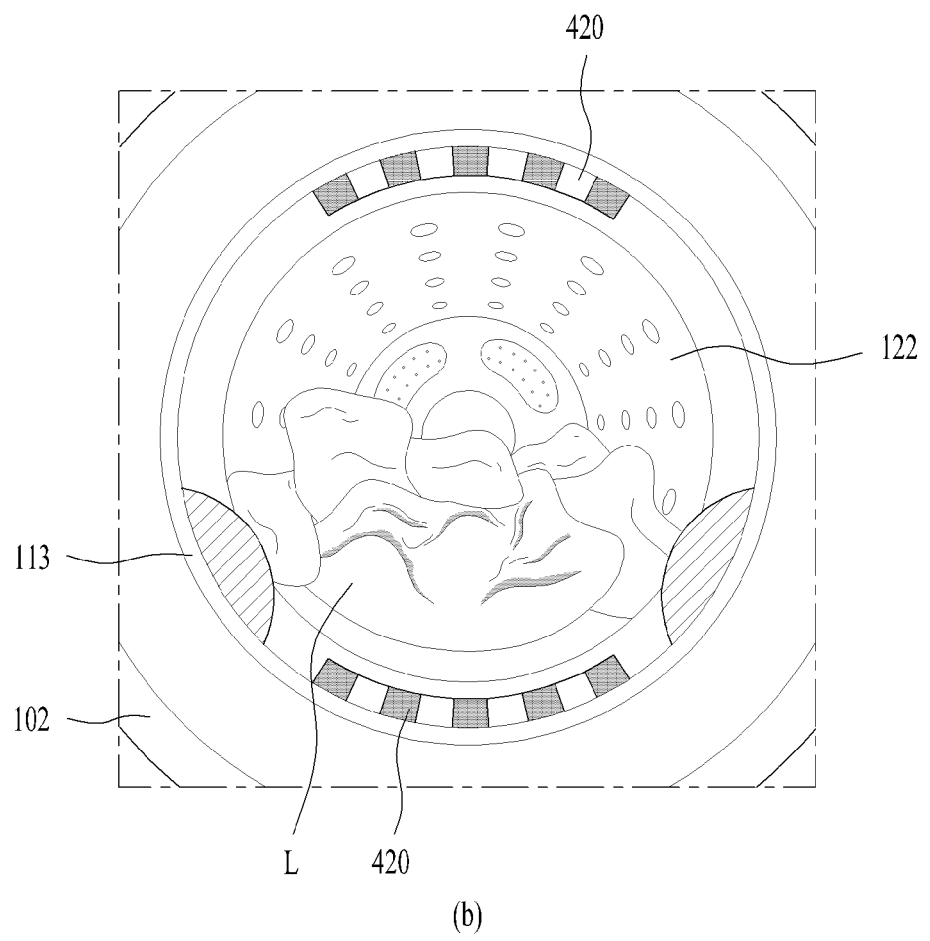
(b)

[Fig. 15]
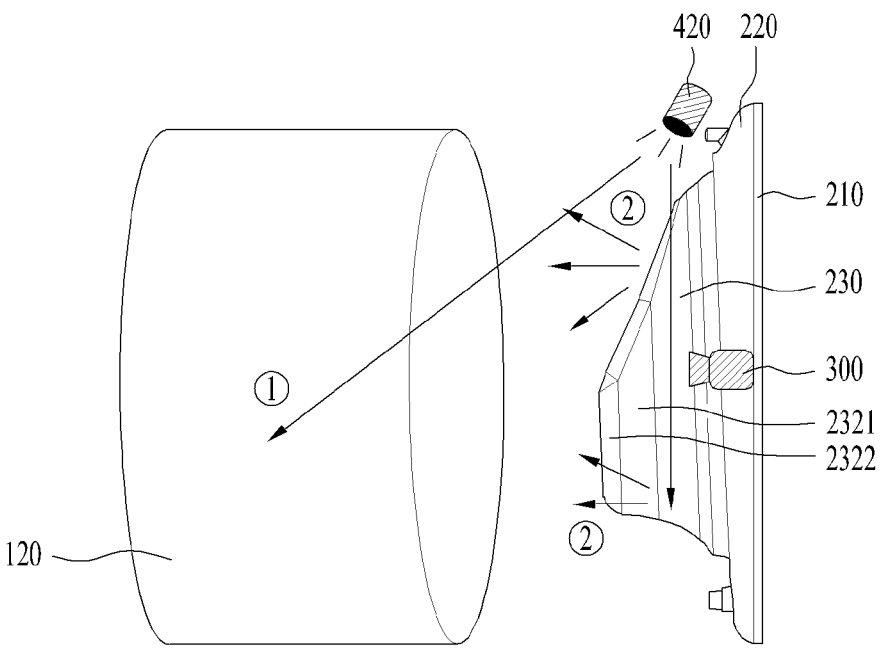
[Fig. 16]
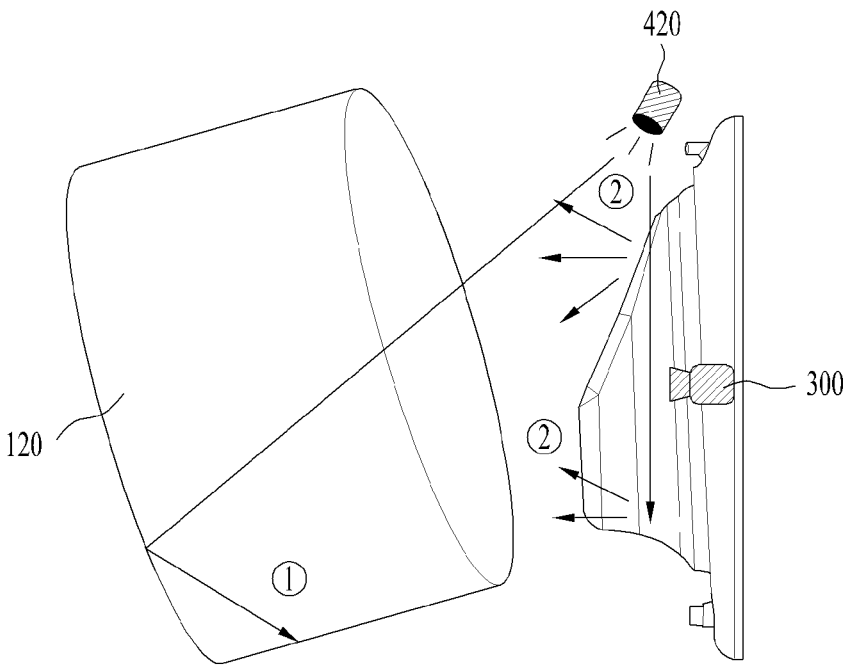

[Fig. 17]
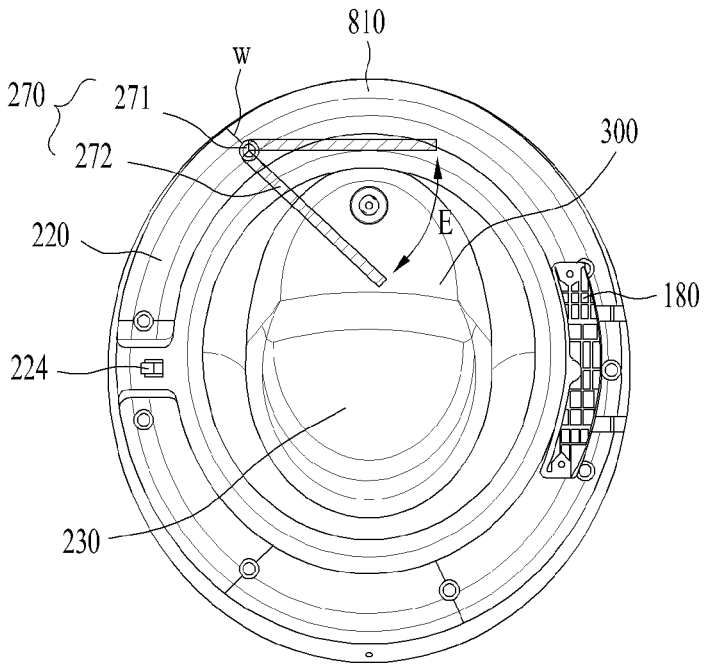
[Fig. 18]
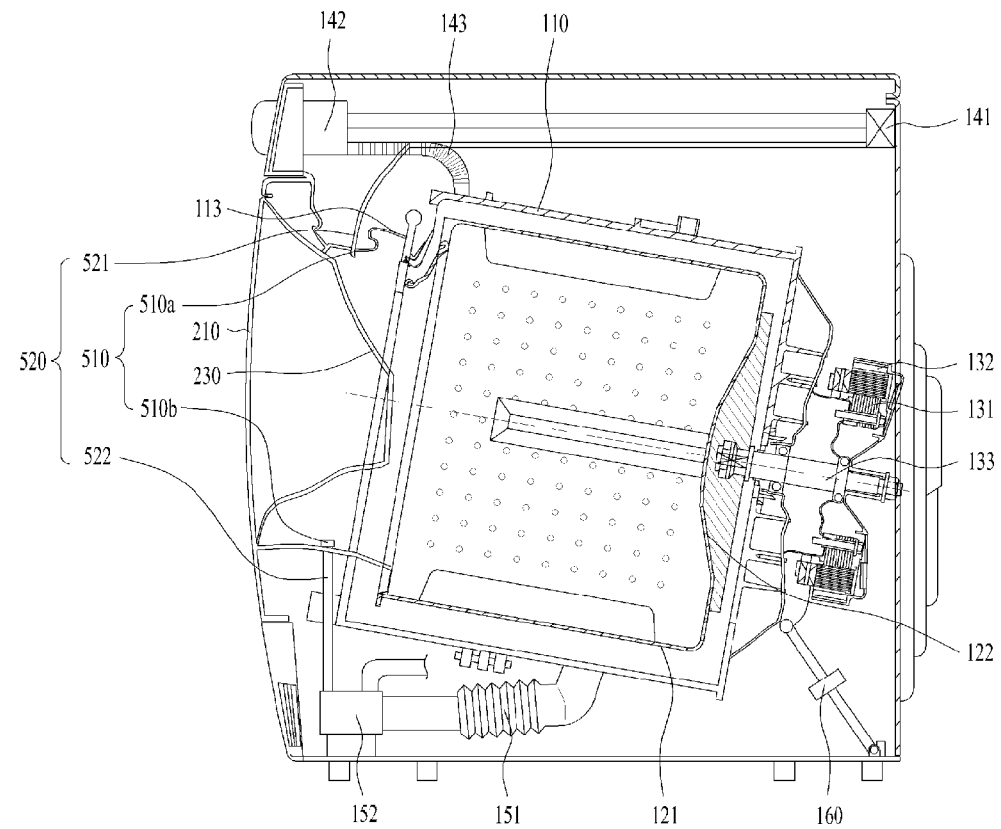

[Fig. 19]
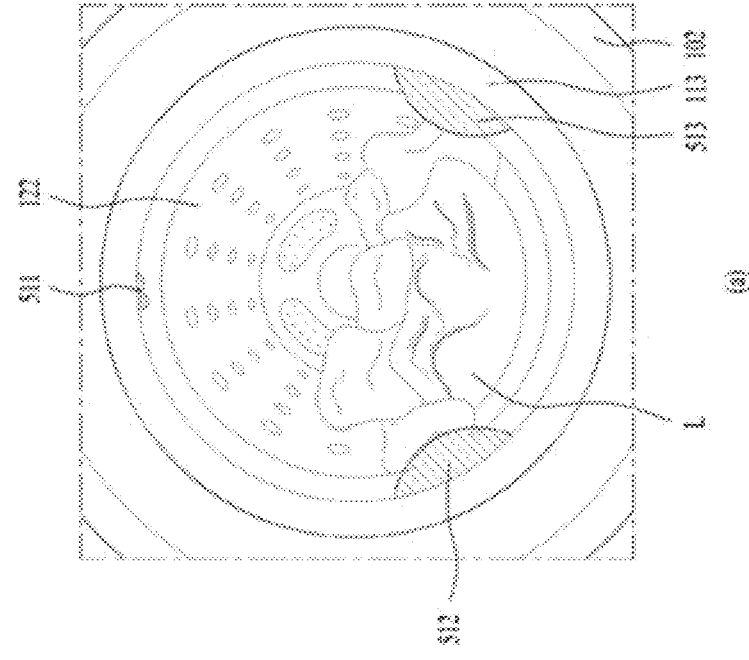

[Fig. 20]
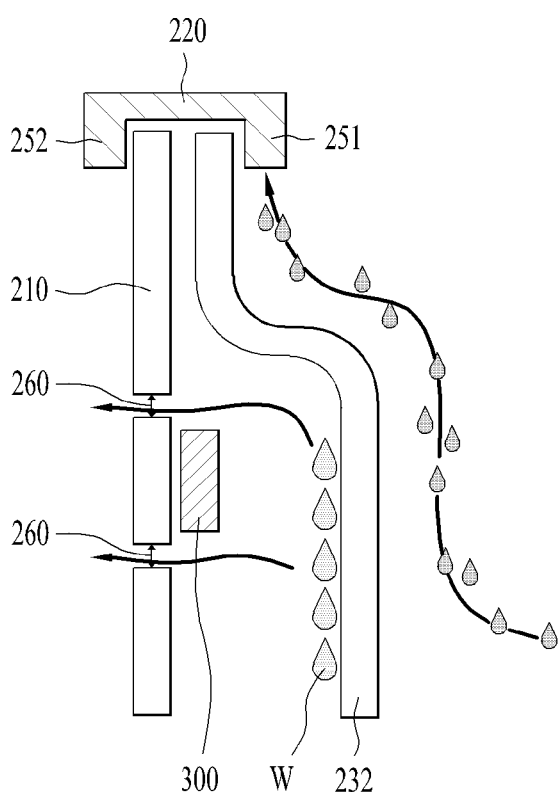

[Fig. 21]

[Fig. 22]
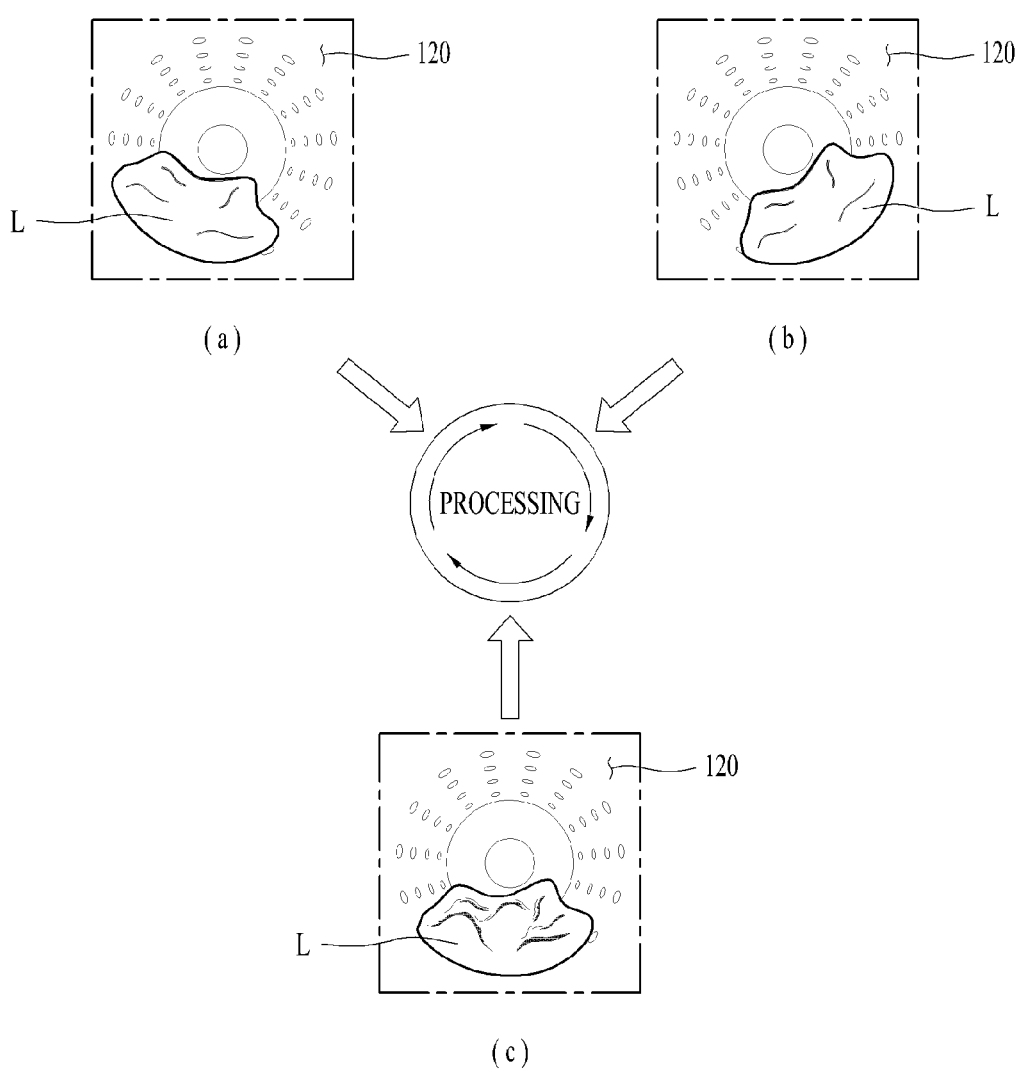

[Fig. 23]
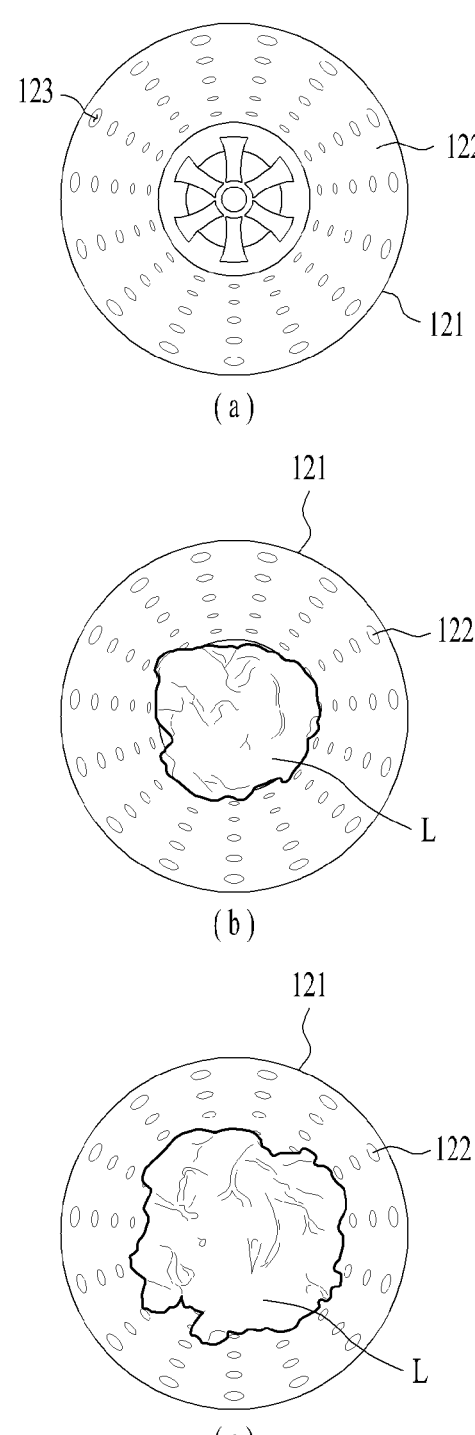
(a)
(b)
(c)

[Fig. 24]
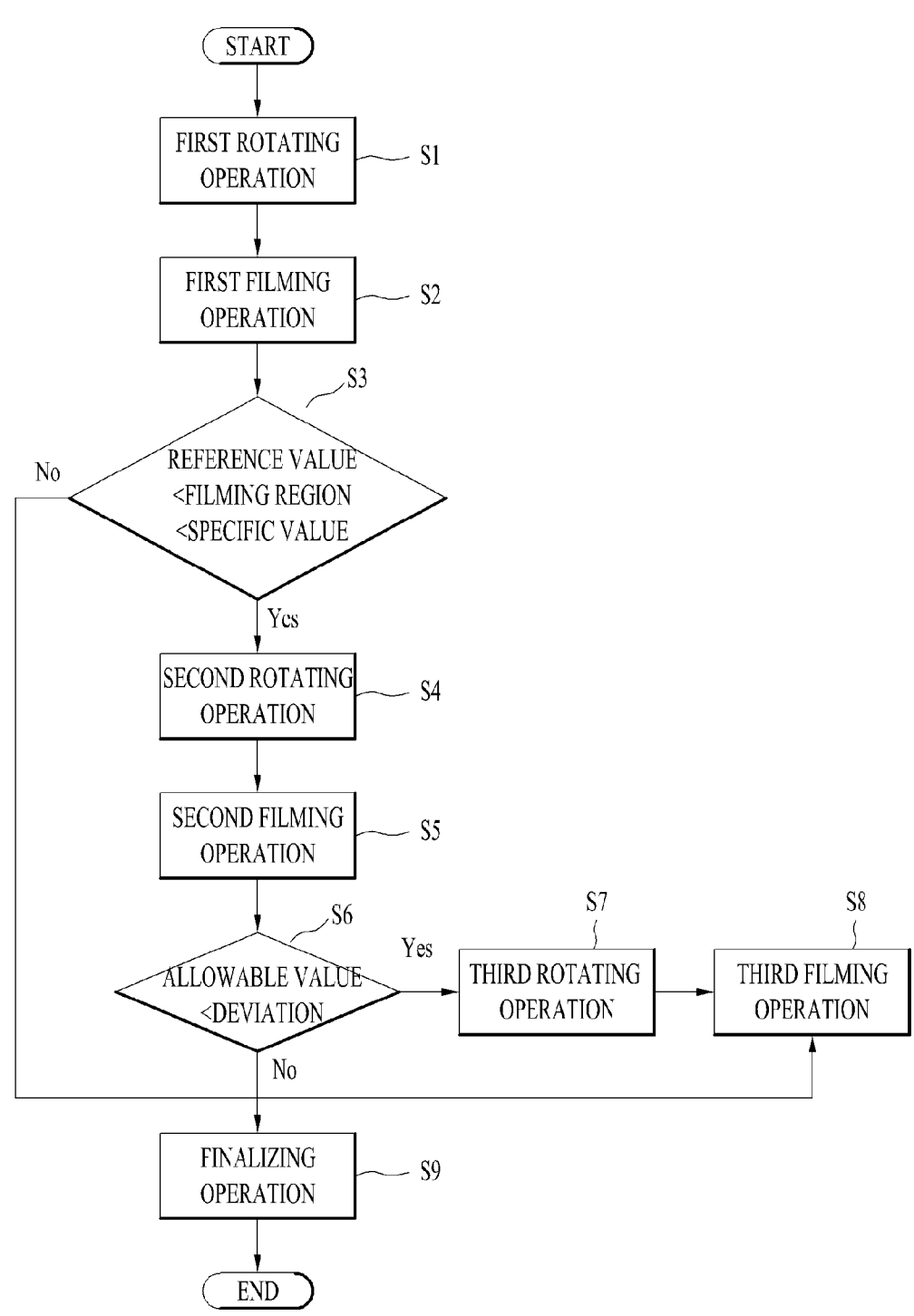

[Fig. 25]
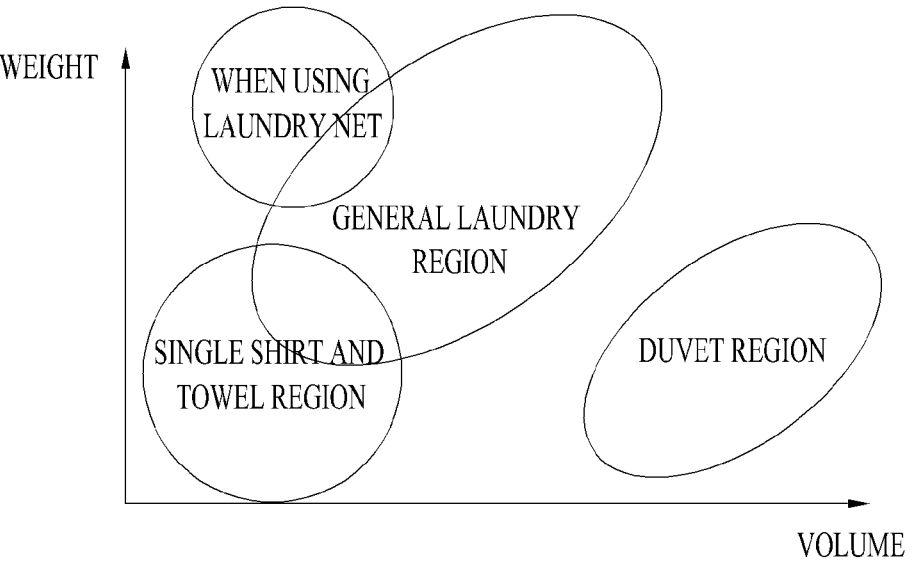
[Fig. 26]
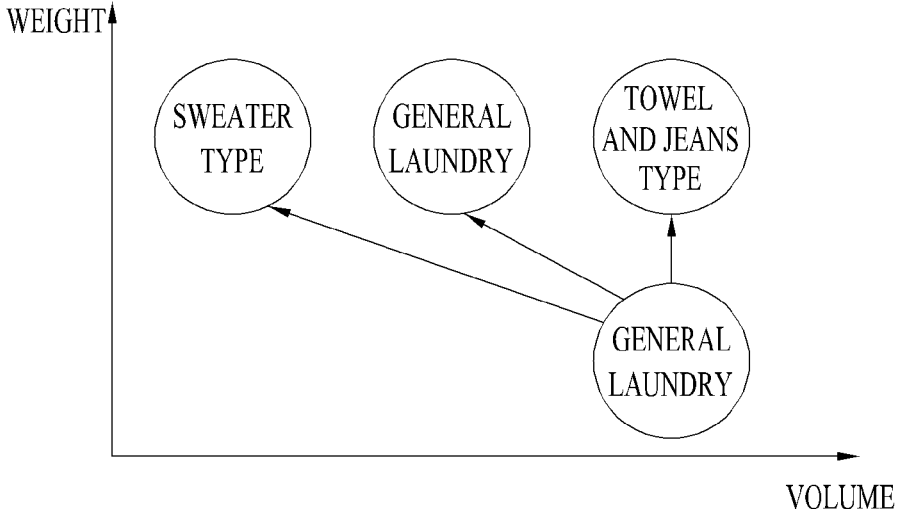

[Fig. 27]
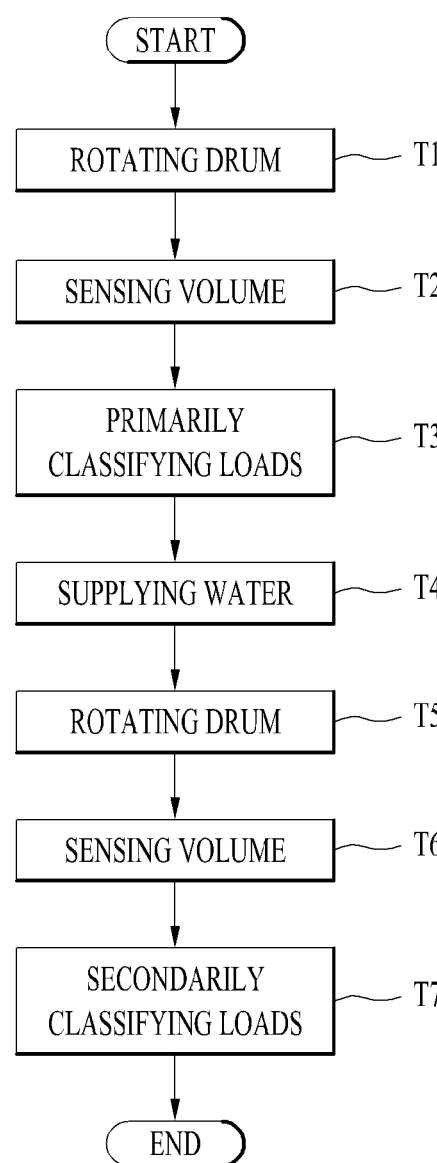

METHOD FOR CONTROLLING LAUNDRY TREATING APPARATUS

CROSS-REFERENCE TO RELATED APPLICATIONS

This application is a National Stage application under 35 U.S.C. § 371 of International Application No. PCT/KR2021/014298, filed on Oct. 15, 2021, which claims the benefit of Korean Patent Application No. 10-2020-0133617, filed on Oct. 15, 2020. The disclosures of the prior applications are incorporated by reference in their entirety.

TECHNICAL FIELD

The present disclosure relates to a method for controlling a laundry treating apparatus. More particularly, the present disclosure relates to a method for controlling a laundry treating apparatus capable of improving accuracy of a volume of laundry sensed through a camera.

BACKGROUND ART

In general, a laundry treating apparatus is an apparatus for cleaning through processes such as washing, rinsing, dehydration, and the like to remove contamination from clothes, bedding, and the like (hereinafter, 'laundry') using water, detergent, and a mechanical action.

The laundry treating apparatus supplies the water and the detergent to the laundry, then washes the laundry by applying a mechanical force, then rinsing the laundry through drainage and re-supply of the water, and then, performs a dehydration treatment of draining all the water and discharging moisture contained in the laundry.

In this connection, among the laundry, those with low density and soft fabric, such as blankets, towels, and T-shirts, absorb a relatively large amount of supplied water, and those with high density and thick and stiff fabric, such as jeans and cloth, absorb relatively small amount of supplied water. Accordingly, even when the same amount of water is supplied to wash the laundry, a water level in a drum may vary.

In addition, there is a risk that the laundry is stretched or damaged when a strong mechanical force is applied to the laundry with thin fabric, and there is a risk that the washing of the laundry may not be completely performed when a weak mechanical force is applied to the laundry with thick fabric.

Therefore, there is a need for the washing machine to supply water of an appropriate water level by identifying the fabric of the laundry, or to adjust intensity of a course or an option such as a rotation speed and a rotation time of the drum, an agitation cycle, and the like.

Conventionally, the fabric of the laundry was estimated by sensing an input current or an output current of a driver that rotates the drum to identify a weight of the laundry. Because a volume of the laundry is not able to be accurately sensed through the driver, it was impossible to accurately calculate the fabric of the laundry.

In order to ameliorate this, recently, a laundry treating apparatus equipped with a camera capable of sensing the volume by directly filming the laundry has appeared [Korea Patent Publication Application No. 10-2017-0090162, Korea Patent Publication Application No. 10-2019-0095191, and the like].

FIG. 1 shows a structure of a conventional laundry treating apparatus having a camera.

Referring to (a) in FIG. 1, the conventional laundry treating apparatus includes a cabinet 10 that has an opening defined in a front surface thereof, an accommodating portion 50 that is accommodated in the cabinet to accommodate the laundry therein, a door 30 that shields the opening, and a camera 20 that is coupled to the door 30.

It may be considered that the camera 20 is disposed in the accommodating portion 50 or on a gasket disposed on an outer circumferential surface of the accommodating portion 50. However, because the camera 20 is vulnerable to moisture and temperature, it is preferable for the camera 20 to be disposed on the door 30 so as to be maximally prevented from being exposed to the water accommodated in the accommodating portion 50.

Accordingly, the laundry treating apparatus was able to sense the volume of the laundry by filming the laundry through the camera 20, and as a result, was able to relatively accurately recognize the fabric of the laundry. Furthermore, the conventional laundry treating apparatus has an advantage of being able to determine the appropriate water level based on the fabric of the laundry, or being able to automatically recommend or determine the course or the option.

Referring to (b) in FIG. 1, an inner glass 50 put into the accommodating portion 50 may be coupled to the door 30, and the camera 20 may be disposed between the door 30 and the inner glass 50.

A frame may be disposed on an outer circumferential surface of the door 30, so that a space in which an electric wire may be mounted may be secured. Accordingly, the camera 20 may be disposed adjacent to the frame of the door 30.

However, when being placed on the frame of the door 30, the camera 20 was not able to film an entirety of the accommodating portion 50 up to a rear surface of the accommodating portion 50 because the laundry is filmed in a wrong direction, or was not able to identify an overall shape of the laundry.

In addition, when the opening is defined in the front surface of the cabinet as in the conventional laundry treating apparatus, the water may be filled up to a certain height of the door 30, so that a situation in which water repeatedly splashes up to an upper end of the door 30 may occur as the accommodating portion 50 rotates.

Accordingly, the conventional laundry treating apparatus had a problem that the water is directly introduced to a space between the door 30 and the inner glass 50 to damage the camera 20, moisture is introduced to the space between the door 30 and the inner glass 50 to damage an internal circuit of the camera 20, or an accurate image is not able to be obtained as water droplets are formed on a lens of the camera 20.

In addition, in the conventional laundry treating apparatus, foreign substances such as stains, lint, and the like may be attached to an inner wall of the door 30, so that a clear image was not able to be obtained with the camera 20.

In addition, the conventional laundry treating apparatus had a problem in that an accurate image of the laundry was not able to be obtained with the camera 20 as sufficient light is not input into the accommodating portion 50.

Moreover, the conventional laundry treating apparatus [50] had a limitation of not being able to provide a criterion or algorithm for when to drive the camera 20 to accurately obtain the fabric or a material of the laundry as well as the volume of the laundry through the camera 20. Accordingly, there was a problem that reliability was not able to be guaranteed because a type or the fabric of the laundry was not able to be accurately identified even when the camera was placed.

DISCLOSURE OF INVENTION

Technical Problem

The present disclosure is to provide a laundry treating apparatus that may film laundry without a camera being affected by water accommodated inside a drum.

The present disclosure is to provide a laundry treating apparatus that may block water from being injected into a camera or block exposure of the camera to water.

The present disclosure is to provide a laundry treating apparatus that may discharge or remove moisture at an interior of a door where a camera is disposed.

The present disclosure is to provide a laundry treating apparatus that may film an entire drum in which laundry is accommodated by disposing a camera to be spaced apart from an outer circumferential surface or a frame of a door by a predetermined distance.

The present disclosure is to provide a laundry treating apparatus that may block an image from being distorted by water accommodated in a drum, or block a camera from being affected by a temperature of the water and decreasing in performance.

The present disclosure is to provide a laundry treating apparatus in which a lighting fixture irradiating light is installed inside a drum that may prevent the camera from directly filming the lighting fixture.

The present disclosure is to provide a laundry treating apparatus that may wash a space around a door where a camera is disposed.

The present disclosure is to provide a control method that may accurately sense fabric, a material, a type, or the like as well as a volume of laundry through a camera.

Solution to Problem

A laundry treating apparatus according to the present disclosure may perform sensing of laundry in a dry state and sensing of the laundry in a wet state.

When performing the sensing, a volume of the laundry may be sensed using a vision camera, and an amount (a weight) of the laundry may be sensed through rotation of a drum. A method for sensing the weight may use existing motor electrical information.

The process of sensing the volume may be performed after the rotation of the drum. The process of sensing the weight may be calculated using information of when the drum rotates. For example, an electrical signal may be stored simultaneously with the rotation, and the stored value may be calculated after the rotation is terminated.

Primary classification of a load may be performed using a value sensed using the volume and the amount of laundry in the dry state of the laundry. Representative examples of laundry that may be classified through the primary classification include a duvet, general laundry, and the like.

Secondary classification may perform water supply, and may use a change in volume that occurs when laundry is wetted with water. For the secondary classification, an amount of change in the volume or the weight may be used along with the volume and the amount of laundry in the primary classification.

Information that may be identified through the secondary classification includes material information and the like.

In one example, a sensing result of the volume may significantly vary depending on how the laundry is stacked. This is because a method of inputting the laundry differs from person to person, and a direction in which laundry is input is also different. Some people put the laundry into the drum like throwing it, while others press the laundry firmly and put it into the drum. In this case, accurate weight or volume estimation may be difficult due to changes in volume and density.

Therefore, a laundry volume sensing performance may be further improved by normalizing a space in laundry through the rotation of the drum. The rotation of the drum may be performed to improve reliability of the laundry volume value.

For volume measurement with higher reliability, usually both clockwise and counterclockwise rotations may be used.

The density of laundry varies depending on a type of laundry. Factors affecting the density are a material of the laundry and a weaving method of the laundry. In this connection, the weaving method relates to whether the laundry is made to be small and to be easily deformable like baby laundry or a small towel, and whether the laundry is made to be large like a duvet or to maintain a specific shape like a lace or a dress.

For the same load, a weight-to-volume ratio is different. The laundry like the duvet may be primarily classified using the same. As the laundry absorbs water, the volume thereof decreases and the weight thereof increases. General laundry other than the duvet, a laundry net, and the like that may be classified in advance includes a wide variety of laundry, but is able to be secondarily classified because a moisture content rate and a weight change rate are different for each material.

For example, an increase in weight resulted from water absorption is equally applied for all laundry. However, what keeps the volume the same or decreases in the volume is laundry made of cotton like a towel that is with small weaving gap and tight, jeans, and the like. A sweater with wide weaving gap and excellent water absorption results in a large volume reduction compared to an increase in weight. The general laundry, which is a mixture of various materials, takes on an intermediate form. Using such characteristics, the material of laundry may be sensed.

In one example, the laundry treating apparatus according to the present disclosure may sense the volume of the laundry by separating a foreground and a background from an image acquired with a camera. A drum background or a dark portion may be represented as the background, and a laundry portion received light may be defined as the foreground. Using a ratio of the background and the foreground to an entire region, the laundry may be separated, and thus, the volume of the laundry may be calculated. The volume of the laundry may also be calculated through a direct non-linear reasoning method using a regression model of a CNN.

Advantageous Effects of Invention

The present disclosure may film the laundry without the camera being affected by the water accommodated inside the drum.

The present disclosure may block the water from being injected into the camera or block the exposure of the camera to the water.

The present disclosure may discharge or remove the moisture at the interior of the door where the camera is disposed.

The present disclosure may film the entire drum in which the laundry is accommodated by disposing the camera to be spaced apart from the outer circumferential surface or the frame of the door by the predetermined distance.

The present disclosure may block the image from being distorted by the water accommodated in the drum, or block the camera from being affected by the temperature of the water and decreasing in the performance.

The present disclosure may prevent the camera from directly filming the lighting fixture that is installed inside the drum to irradiate the light.

The present disclosure may wash the space around the door where the camera is disposed.

The present disclosure may accurately sense the fabric, the material, the type, or the like as well as the volume of the laundry through the camera.

BRIEF DESCRIPTION OF DRAWINGS

FIG. 1 shows a conventional laundry treating apparatus.

FIG. 2 shows an internal structure of a laundry treating apparatus according to the present disclosure.

FIG. 3 shows an appearance of a laundry treating apparatus according to the present disclosure.

FIG. 4 shows a structure of a door of a laundry treating apparatus according to the present disclosure.

FIG. 5 shows a camera placement region of a laundry treating apparatus according to the present disclosure.

FIG. 6 shows an embodiment of a camera installation structure of a laundry treating apparatus according to the present disclosure.

FIG. 7 shows another embodiment of a camera installation structure of a laundry treating apparatus according to the present disclosure.

FIG. 8 shows an electric wire displacement structure of a laundry treating apparatus according to the present disclosure.

FIG. 9 shows a need for a lighting fixture in a laundry treating apparatus according to the present disclosure.

FIG. 10 shows an embodiment of a laundry treating apparatus according to the present disclosure in which a lighting fixture is disposed inside a door.

FIG. 11 shows a problem that may occur by a lighting fixture disposed inside a door.

FIG. 12 shows a placement region of a lighting fixture.

FIG. 13 shows an effect that occurs due to a change in an angle of a drum in FIG. 12.

FIG. 14 shows an embodiment in which a lighting fixture is disposed outside a door.

FIG. 15 shows a structure that may block a camera from filming a lighting fixture disposed outside a door.

FIG. 16 shows an effect that occurs due to a change in an angle of a drum in FIG. 15.

FIG. 17 shows a structure of a wiper capable of cleaning a door.

FIG. 18 shows a structure of a spray nozzle capable of cleaning a door.

FIG. 19 shows a utilization embodiment of a spray nozzle.

FIG. 20 shows an embodiment capable of discharging or blocking moisture at a door according to the present disclosure.

FIG. 21 shows a structure in which a camera may block moisture.

FIG. 22 shows a method for identifying a volume of laundry with a camera.

FIG. 23 shows another method for identifying a volume of laundry with a camera.

FIG. 24 shows an embodiment for accurately identifying a volume of laundry with a camera.

FIG. 25 shows criteria for classifying types of laundry.

FIG. 26 shows criteria for classifying fabrics of laundry.

FIG. 27 shows an embodiment of identifying a fabric of laundry with a camera.

MODE FOR THE INVENTION

Hereinafter, embodiments disclosed herein will be described in detail with reference to the accompanying drawings. In this specification, the same and similar reference numerals are assigned to the same and similar components even in different embodiments, and a description of a following component is replaced by a description of a previous component. As used herein, the singular expression includes the plural expression unless the context clearly dictates otherwise. In addition, in describing the embodiment disclosed in the present specification, when it is determined that a detailed description of a related known technology may obscure the gist of the embodiment disclosed in the present specification, the detailed description thereof will be omitted. In addition, the accompanying drawings are only for easy understanding of the embodiments disclosed in the present specification, and it should be noted that the technical idea disclosed herein is should not be construed as being limited by the accompanying drawings.

FIG. 2 shows an internal structure of a laundry treating apparatus according to the present disclosure.

A laundry treating apparatus according to the present disclosure may include a cabinet 100 that constitutes an appearance of the laundry treating apparatus, and a laundry accommodating portion disposed inside the cabinet 100 to accommodate laundry therein.

The laundry accommodating portion may include a tub 110 that is accommodated in the cabinet 100 and stores water therein, a drum 120 that is accommodated in the tub 110 and rotates, a driver 130 that is coupled to the tub 110 to rotate the drum 120, a suspension 160 that supports the tub 110 at a position inside the cabinet 100, a water supply 140 that is provided to supply water to the tub 110, and a drainage 150 that drains the water of the tub 110.

The tub 110 may include a tub body 111 that accommodates water therein, an inlet 112 defined in a front surface of the tub body, wherein the laundry is put into the inlet 112, and a gasket 113 disposed along a circumference of the inlet 112 to block the water accommodated in the tub body 111 from being discharged to the outside.

The drum 120 may include a drum body 121 that is rotatably disposed in the tub body 111, and a drum rear surface 122 coupled to the driver 130 to rotate the drum body 121. The drum body 121 may have a drum inlet defined therein corresponding to the inlet 112.

The suspension 160 may include a damper 161 that supports a load of the tub 110 and reduces vibration, and a support 162 that connects the damper 161 and the tub 110 to each other. The support 162 may be formed in a beam or bar shape to support the driver 130 while simultaneously supporting the load of the tub 110, and may be provided to support a bearing housing that is injection-molded inside the tub 110.

The water supply 140 may include a water supply pipe 141 connected to an external water supply source to supply water to the tub 110. The water supply pipe 141 may be provided to directly supply water to the tub 110, or provided to be in communication with a detergent box 142 disposed above the tub 110. The detergent box 142 and the tub 110 may be connected to each other through a supply pipe 143. The supply pipe 143 may be connected to the gasket 113 to supply water to the tub body 111.

The drainage 150 may include a drain pipe 151 connected to the tub body 111 to receive water from the tub 110, a drain pump 152 connected to the drain pipe 151 to provide power for discharging the water in the tub 110 to the outside, and a discharge pipe 153 that extends from the drain pump 152 to the outside of the cabinet 100 to discharge water. A filter member 154 may be disposed on one side of the drain pump 152 to be in communication with the drain pump 152.

In one example, the drainage 150 may further include a circulator 87 that circulates the water of the tub 110 to re-supply the water to the tub 110.

The circulator 87 may include a circulating pump 872 in communication with the drain pump 152, a circulating pipe 871 that extends from the circulating pump 872 to the tub 110, and a circulating valve 873 that adjusts an opening of the circulating pipe 871.

Accordingly, the water of the tub 110 may be directly discharged through the drainage 150 or may circulate through the circulator 87.

FIG. 3 shows an appearance of a laundry treating apparatus according to the present disclosure.

The cabinet 100 may include a front panel 101 in communication with the inlet 112 and having an opening 102 defined therein through which the laundry is input, side panels 104 respectively disposed on both side surfaces of the front panel 101, and a top panel 103 coupled to upper ends of the front panel 101 and the side panels 104.

The laundry treating apparatus 1 according to the present disclosure may further include a door 200 that opens and closes the opening 102 to prevent the water of the tub 110 or the laundry of the drum 120 from being discharged to the outside.

The door 200 may include a door frame 220 pivotally disposed on a hinge 180 coupled to the front panel 101, and an inner panel 230 coupled to a rear surface or one surface of the door frame 220 to seal the inlet 112. The door frame 220 may have an area corresponding to that of the opening 102, and the inner panel 230 may be inserted into the opening 102 to be inserted into the inlet 112.

The inner panel 230 may be in contact with an inner circumferential surface of the gasket 113 or may press the inner circumferential surface of the gasket 113 to seal the inlet 112, thereby preventing the water accommodated in the tub 110 from leaking to a space between the tub 110 and the cabinet 100.

In one example, the opening 102 may be defined with a step such that the door frame 220 is accommodated on an outer circumferential surface thereof. In this connection, the step of the opening 102 may be collectively referred to as the gasket 113 because the step of the opening 102 is for strengthening the sealing effect as the door 200 is closely coupled to the opening 102.

The inner panel 230 may have a concave surface 2322 concavely defined in an inner circumferential surface of the inner panel 230 to guide the laundry or the water back into the tub 110 when the laundry or the water collides therewith.

FIG. 4 shows a structure of a door of a laundry treating apparatus according to the present disclosure.

The door frame 220 may include a frame body 221 coupled to the hinge 180, and a see-through hole 222 penetrating the frame body 221 to expose an interior of the drum 120.

The frame body 221 may be formed in a circular shape to be in contact with the gasket 113. The frame body 221 may be formed in a plate shape as shown, or may be formed in a ring shape not as shown.

The inner panel 230 may be coupled to a surface of the frame body 221 on one side. The inner panel 230 may be made of a transparent material to allow the user to see the interior of the drum 120 through the see-through hole 222.

The inner panel 230 may have an area corresponding to that of the see-through hole 222 and may be coupled to the see-through hole 222, or may have an area corresponding to that of the frame body 221 and may be coupled to the frame body 221.

In one example, the door 200 may include an outer panel 210 coupled to a front surface or the other surface of the door frame 220 and exposed to the outside of the cabinet 100. The outer panel 210 may be disposed to face the inner panel 230.

The outer panel 210 may be entirely made of a transparent material. The outer panel 210 may have a color such as black to prevent excessive exposure of a lighting fixture inside the drum 120 to the outside.

In one example, the inner panel 230 may include a coupling body 231 coupled to and fixed to the frame body 221, and a protruding body 232 protruding from the coupling body 231 and inserted into the inlet 112.

The protruding body 232 may be inserted into the inlet 112 and collide with the water and the laundry, and a coupling force between the inner panel 230 and the door frame 220 may be weakened. Accordingly, the door 200 may further include a coupling frame 240 that fixes the inner panel 230 to the door frame 220. The coupling frame 240 may include a coupling surface 241 that may press one surface of the coupling body 231 while being coupled to the frame body 221, and a coupling hole 242 that passes through the coupling surface 241 to be in communication with the see-through hole 222.

In one example, the door 200 may further include a fastening member 280 capable of coupling the door frame 220, the inner panel 230 or the coupling frame 240, and the outer panel 210 to each other. The fastening member 280 may be coupled through the door frame 220 and the coupling frame 240, and the inner panel 230 may be fixed as both surfaces thereof are pressed by the door frame 220 and the coupling frame 240.

In one example, the outer panel 210 and the inner panel 230 may be coupled to each other without the door frame 220 to form an appearance of the door 200.

In addition, the outer panel 210 and the inner panel 230 may be attached to and fixed to the door frame 220 with an adhesive or the like.

The outer panel 210 may be entirely made of a transparent material. The outer panel 210 may have a color such as black to prevent excessive exposure of a lighting fixture inside the drum 200 to the outside.

In one example, the laundry treating apparatus of the present disclosure may include a camera 300 capable of filming the interior of the drum 200. When the camera 300 is attached to an outer surface of the inner panel 230, the camera 300 may be exposed to the water. when the camera 300 is attached to an outer surface of the outer panel 210, the camera 300 may collide with the user and be damaged.

Accordingly, the camera 300 may be disposed between the outer panel 210 and the inner panel 230 to film the interior of the drum 120.

In addition, the inner panel 230 may have difficulty fixing the camera 300 because of the protruding body 232. Accordingly, the camera 300 may be disposed to be spaced apart from the inner panel 230, and may be attached to the door frame 220 or the outer panel 210. The camera 300 may be spaced apart from the door frame 220 so as to film up to the drum rear surface 122 and may be fixedly attached to an inner surface of the outer panel 210.

FIG. 5 shows an installation position of the camera 300.

The door 200 may be exposed to water up to a portion thereof corresponding to a maximum water level H of the tub 110. Therefore, when the camera 300 is disposed in a lower region IV that is lower than the portion of the door 200 corresponding to the maximum water level H, it may be difficult for the camera 300 to accurately film the laundry accommodated in the drum due to vibration of the water. In addition, when the water is hot water, the camera 300 may be damaged or noise may occur in a control signal due to generated heat. Accordingly, the camera 300 may be disposed at a portion of the door 200 higher than the portion of the door 200 corresponding to the maximum water level H.

In general, the maximum water level H does not rise above a ½ point of a height of the door 200, so that the camera 300 may be disposed at a center of the door or upper regions I, II, and III that are higher than center of the door.

The camera 300 may be disposed at a center without being biased to left or right with respect to the inlet 112. That is, the camera 300 may be disposed in central regions I and II based on a width of the inlet 112.

This may be calculated while the image of the laundry camera 300 is inverted left and right by a controller of the laundry treating apparatus or a camera controller. In this connection, when the camera 300 is biased to the left or right with respect to the inlet 112, bias between the original photo and the inverted photo may be severe, so that accurate image editing may not be possible.

Accordingly, the camera 300 may be disposed in the central regions I and II based on the width of the inlet 112.

In this connection, the camera 300 may be disposed in the upper region I biased to an upper portion of the inlet 112.

A power line or a control line (hereinafter, a signal line) connected to a controller or a power supply disposed inside the cabinet 100 may be transmitted to the door frame 220 through the hinge 180. As a result, as the camera 300 becomes closer to the door frame 220, the signal line extending from the door frame 220 to the camera 300 may become shorter, so that stability may be increased.

In addition, the camera 300 may be disposed in the central region II with respect to the inlet 112. Accordingly, the camera 300 may film the drum up to the drum rear surface 122 as a wider angle of view is secured, thereby filming all laundry accommodated in the drum.

FIG. 6 shows an embodiment of the camera 300.

The camera 300 may include a casing 310 coupled to the outer panel 210 or disposed between the outer panel 210 and the inner panel 230 to accommodate a lens 320 for filming the image therein, and a connection duct 340 in which a signal line 330 for supplying power or transmitting a control signal to the lens 320 is accommodated.

The lens 320 may be provided as a complete camera that substantially films and stores or transmits the image.

In addition, the casing 310 may not only include the lens 320 for filming the image, but also, a photo controller for controlling a focus of the lens, storing the image filmed by the lens 320, or editing the image.

In one example, the separate controller disposed inside the cabinet 100 to control a control panel or the driver may also perform a role of the photo controller.

Because the lens 320 is disposed to be spaced apart from the door frame 220, the signal line 330 may extend from the door frame 220 toward the casing 310. The signal line 330 may extend into the cabinet 100 through the hinge 180 along the door frame 220.

The connection duct 340 may be provided to accommodate therein the signal line 330 exposed inside the door 200. The connection duct 340 may extend from the door frame 220 to the casing 310.

The connection duct 340 may be provided to not only block exposure of the signal line 330 to the outside, but also to fix the signal line 330 at a location inside the door 200. Accordingly, it is possible to prevent an unnecessary external force or signal from being transmitted to the signal line 330 to prevent a noise signal from being generated, and to prevent the signal line 330 from being damaged by vibration, moisture, or the like.

The connection duct 340 may be disposed in a region corresponding to the shortest distance between the lens 320 and an inner circumferential surface of the door frame 220. For example, when the lens 320 is disposed in the upper region I, the connection duct 340 may extend from an upper portion of the door frame 220 to the lens 320.

In one example, when the lens 320 is disposed in the central region, the connection duct 340 may be disposed to extend from the door frame 220 where the hinge 180 is disposed. Accordingly, it is possible to reduce a possibility of the occurrence of the noise by reducing a length of the signal line extending inside the door frame 220.

The connection duct 340 may include a tunnel body 341 that accommodates the signal line 330 therein, and a tunnel groove 342 defined inside the tunnel body 341 and in which the signal line 330 is seated.

A portion of the tunnel body 341 facing the outer panel 210 may be formed in a straight line shape or in a shape corresponding to a shape of a surface of the outer panel 210, and a portion of the tunnel body 341 facing the inner panel 230 may have a curved shape.

For example, a cross-section of the tunnel body 341 may be formed in an arcuate shape. Accordingly, the tunnel body 341 may not only be fixed in contact with the outer panel 210, but also protect the signal line 330 from being affected by an external environment by dispersing the vibration when the vibration generated in the tub 110 is transmitted to the tunnel body 341 or the generated vibration is transmitted through the door frame 220.

FIG. 7 shows another embodiment of the camera 300.

Referring to (a) in FIG. 7, the connection duct 340 may be omitted from the camera 300. That is, only the casing 310 and the lens 320 may be disposed inside the door 200, and the connection duct 340 may not be installed.

Accordingly, it is possible to prevent a situation in which the connection duct 340 blocks a portion of the see-through hole 222 of the door frame 220, so that the user may more easily identify an internal state of the drum 120, and aesthetic sensibility may be maximized.

However, because the signal line 330 needs to transmit the power or the signal to the casing 310, the signal line 330 may be disposed as it is. In this connection, when the signal line 330 blocks a view of the user, the effect of omitting the connection duct 340 may not be completely derived.

Accordingly, an entirety or a portion of the signal line 330 may also be provided to transmit light. That is, because the signal line 330 itself is made of a material with high transparency or made to be transparent, the light may pass through the signal line 330 as it is or the signal line 330 may be less identified.

In particular, when the outer panel 210 is not completely transparent but is made of a material that is translucent or has a dark color, the signal line 330 may be even less identifiable.

The signal line 330 may extend from the door frame 220 to the casing 310, and the casing 310 may include an input hole 313 defined therein into which the signal line 330 may be input.

Referring to (b) in FIG. 7, the signal line 330 may be formed as a transparent line 331 that is entirely transparent. The transparent line 331 may include a first terminal 3311 input to the input hole 313, a second terminal 332 coupled to the door frame 220, and a transparent film 3313 that transmits an electrical signal from the first terminal to a coupling terminal.

The transparent film 3313 may be made of a material capable of transmitting a current or a control signal while having high transparency. For example, the transparent film 3313 may be formed as an ITO film or the like capable of transmitting the current or the control signal.

The transparent film 3313 may be formed in a plate shape and may be fixed in contact with one surface of the outer panel 210.

Referring to (c) in FIG. 7, the signal line 330 may be formed as a transparent film 3313 in which, although an electric wire is not transparent, a sheath surrounding the electric wire is made of a transparent material.

The transparent film 3313 may include a contact terminal 3321 put into the input hole 313, a coupling terminal 3323 coupled to the door frame 220, and a transparent sheath 3322 connecting the contact terminal and the coupling terminal to each other.

The transparent sheath 3322 may be made of a transparent material, may be formed in a plate shape, and may be fixed in contact with one surface of the outer panel 210. The transparent sheath 3322 may also be made of a material capable of transmitting the current or the control signal. For example, the transparent sheath 3322 may be formed as a silver paste screen film or the like.

In one example, the signal line 330 may further include a control solid line that transmits a signal of the cabinet 100 to the camera 300 and transmits a signal of the camera 300 to the cabinet 100. The control line may include an input line 330a that transmits the signal from the cabinet to the camera 300, and an output line 330b that transmits the signal from the camera 300 to the cabinet 100.

That is, the transparent line 331 or the transparent film 3313 may also include the input line 330a and the output line 330b.

As described above, the input line 330a and the output line 330b may also be made of a transparent material. However, the input line 330a and the output line 330b may be opaque as a metal material. Nevertheless, the input line 330a and the output line 330b may be blocked from being identified from the outside.

FIG. 8 shows that the input line 330a and the output line 330b are disposed in the signal line 330 so as not to be identifiable.

Each of the input line 330a and the output line 330b may have a thickness and a width that are different from each other. For example, each of the input line 330a and the output line 330b may be formed in a plate shape, so that one surface thereof corresponding to the thickness smaller than the width may be attached to the outer panel 210 or disposed toward the outer panel 210.

That is, the input line 330a and the output line 330b may be disposed such that a direction from the outer panel 210 to the inner panel 230 corresponds to a width direction.

The thickness of the input line 330a and the output line 330b may be very small to such an extent that it is impossible or difficult for the user to identify the input line 330a and the output line 330b. For example, the thickness of the input line 330a and the output line 330b may be smaller than 0.1 mm.

Accordingly, when the user looks directly at the outer panel 210, the user looks at a surface corresponding to the thickness of the input line 330a and the output line 330b (in a direction A). In this connection, because the thickness of the input line 330a and the output line 330b is small, the identification of the input line 330a and the output line 330b may be blocked.

In addition, as the width of the input line 330a and the output line 330b is smaller, the input line 330a and the output line 330b may be difficult to be identified even when viewed from the outside of the outer panel 210 in a direction different from the direction A. For example, the width of the input line 330a and the output line 330b may be set to be equal to or smaller than ¼ of a width of the signal line 330 or the transparent film 3313.

In one example, when a width a of the input line 330a and the output line 330b and a spacing b between the input line 330a and the output line 330b are adjusted, even when the interior of the drum 120 is viewed from any angle from the outside of the door 200, the input line 330a and the output line 330b may be blocked from being identified to the outside.

For example, when the spacing between the input line 330a and the output line 330b and the width of the input line 330a and the output line 330b are determined such that a fixed end of one of the input line 330a and the output line 330b does not block a direction with a maximum angle at which the interior of the drum may be viewed through the inlet 112 from the outside of the door 200, the input line 330a and the output line 330b may not be identified when viewed in any direction by the user from the exterior of the door 200.

To this end, as the spacing b of the control solid line is larger than the width a, the input line 330a and the output line 330b may be prevented from being identified from the outside of the outer panel 210. To this end, the signal line 330 may be formed in a plate shape, and the input line 330a and the output line 330b may be respectively disposed at both ends of the signal line 330.

FIG. 9 shows necessity of a lighting fixture.

Referring to (a) in FIG. 9, laundry L may be accommodated and disposed inside the drum 120. The laundry L may be stacked on a bottom of the drum 120 such that only a portion of the drum rear surface 122 is visible.

However, because light is irradiated into the drum 120 only through the inlet 112 defined at the front, the interior of the drum 120 may not be irradiated with sufficient light, and may be darker than the exterior of the cabinet 100.

(b) in FIG. 9 shows an image of the camera filmed the drum 120.

When the interior of the drum 120 is filmed with the camera 300, the image filmed with the camera 300 may be dark enough that the laundry L is not accurately identified.

Even when a certain amount of light is irradiated to the interior of the drum 120, because the camera 300 receives the light to film the image, the image may be filmed to be darker than the actual interior of the drum 120. Furthermore, because it is difficult for sufficient light to reach the drum rear surface 122, only a portion of the drum 120 may be filmed.

In addition, when the sufficient light is not irradiated into the drum 120, an entirety of the interior of the drum 120 may not be identified by the camera 300.

Therefore, a main controller or the photo controller of the laundry treating apparatus according to the present disclosure may not be able to calculate a volume of the laundry even when the interior of the drum 120 is filmed through the camera 300.

FIG. 10 shows an embodiment of a lighting fixture of a laundry treating apparatus according to the present disclosure.

The laundry treating apparatus according to the present disclosure may include a lighting fixture 400 provided such that the camera 300 may irradiate the sufficient light for filming the interior of the drum 120 into the drum 120.

The lighting fixture 400 may be formed in any shape, such as an LED or an incandescent light bulb, as long as it is provided to irradiate light, and may be controlled by the photo controller or the main controller.

The lighting fixture 400 may be controlled to irradiate the light when the camera 300 operates or until the camera 300 operates starting from a time point before the camera 300 operates. In addition, the lighting fixture 400 may be provided such that the light reaches the drum rear surface 122.

Accordingly, the camera 300 may film an entire region inside the drum 120 without difficulty.

The lighting fixture 400 may include an internal lighting fixture 410 disposed on one side surface of the camera 300. The internal lighting fixture 410 may be disposed inside the door 200 together with the camera 300.

The internal lighting fixture 410 may be provided to irradiate light at an angle of view of the camera 300. For example, the internal lighting fixture 410 may be provided to irradiate the light in a direction parallel to a lens direction of the camera 300.

The internal lighting fixture 410 may be disposed at the rear of the lens of the camera 300 or disposed outside the angle of view of the camera 300. Accordingly, it is possible to prevent the camera 300 from directly capturing the internal lighting fixture 410.

The internal lighting fixture 410 may be disposed outwardly of the lens 320 or the casing 310. As shown, the internal lighting fixture 410 may be disposed along a circumference of the casing 310. In addition, the internal lighting fixture 410 may be disposed on only one side of the casing 310 as long as the internal lighting fixture 410 is able to irradiate the light to a region to be filmed by the lens 320.

FIG. 11 shows that a placement region of the lighting fixture is limited.

(a) in FIG. 11 shows a state in which the laundry is actually disposed inside the drum 120, the camera and the lighting fixture are installed on the door 200, but the lighting fixture 400 does not operate.

When the lighting fixture 400 does not irradiate the light, the interior of the drum 120 may be dark. Thus, even when the interior of the drum 120 is filmed by the camera 300, because the image is dark, the laundry L may not be properly identified.

(b) in FIG. 11 shows an image filmed with the camera 300 while the lighting fixture 400 is operating.

The lighting fixture 400 may irradiate enough light for the interior of the drum 120 to be sufficiently identified by the camera 300.

However, the camera 300 is usually provided to film the image by determining saturation or contrast of the remaining region based on the brightest portion.

In this connection, when the lighting fixture 400 is directly filmed by the camera 300, or when the light that is irradiated from the lighting fixture 400 and reaches the drum 120 is directly reflected to the camera 300, the camera 300 may intensively film a region where light is brightest and may not properly film the remaining portion.

For example, when the lighting fixture 400 is placed above the drum 120 or the light of the lighting fixture 400 is reflected and received by the lens 320, an upper end of the image may be too bright to identify surroundings, and a lower end of the image may be too blurry or light to identify the surroundings.

Accordingly, the laundry treating apparatus according to the present disclosure may place the lighting fixture 400 in a region corresponding to an exterior of the angle of view of the camera 300. In addition, the laundry treating apparatus may be provided to prevent the light irradiated from the lighting fixture 400 from being directly reflected to the camera 300.

FIG. 12 shows an embodiment capable of preventing the camera 300 of the laundry treating apparatus according to the present disclosure from directly filming the lighting fixture 400 or from directly receiving the reflected light.

The camera 300 may be coupled to an inner wall of the outer panel 210, and the lighting fixture 400 may include the internal lighting fixture 410 coupled to the outer panel 210 at one side of the camera 300.

Because the camera 300 is not able to film a side surface of the lens 320, when the internal lighting fixture 410 is disposed in parallel with the camera 300, the internal lighting fixture 410 may be prevented from being filmed directly by the camera 300.

In one example, the inner panel 230 may include a coupling body 231 coupled to the door frame 220, and a protruding body 232 extending from the coupling body 231.

The protruding body 232 may be composed of a protruding surface 2321 protruding so as to be inserted into the inlet 112 from a bottom of the door frame 220 based on a cross-section, a concave surface 2322 extending upwardly from a free end of the protruding surface 2321, and an inclined surface 2323 extending upwardly of the door frame 220 from the concave surface 2322.

The inclined surface 2323 may inclinedly extend from an upper end of the door frame 220 to the concave surface 2322, and the concave surface 2322 may be provided such that an interior thereof is recessed toward the outer panel 210 to be more concave than a circumference thereof.

Accordingly, when the laundry inside the drum 120 collides with the inner panel 230, the laundry may be prevented from escaping to an exterior of the inlet 112 because of the protruding surface 2321, and may be guided back into the drum 120 while moving undamaged along the concave surface 2322 and the inclined surface 2323.

In this connection, the internal lighting fixture 410 may not be disposed to face the concave surface 2322, but may be disposed to face the inclined surface 2323.

The internal lighting fixture 410 may be disposed in a first region I among the first region I and a second region II respectively disposed above and below an upper end of the concave surface. For example, the internal lighting fixture 410 may be disposed above the camera 300.

When the internal lighting fixture 410 is placed in the second region II, even when the concave surface 2322 is concave, light irradiated perpendicular to the concave surface 2322 goes straight along a direction No. 2 and collides with the drum rear surface 122. The light that has collided with the drum rear surface 122 goes straight again in a direction No. 4, which is reverse to the direction No. 2, and moves toward the internal lighting fixture 410.

Accordingly, the light traveling in the direction No. 4 passes through the concave surface 2322 again vertically and directly reaches the camera 300, so that the camera 300 becomes to intensively capture only the light irradiated in the direction No. 4.

However, when the internal lighting fixture 410 is placed in the first region I, the light irradiated from the internal lighting fixture 410 is refracted in a direction No. 1 based on an inclination of the inclined surface 2323 and is dispersed without being directed toward the drum rear surface 122 only.

In addition, the light that has reached the drum rear surface 122 again reaches the inclined surface 2323 along a direction No. 3. When reaching the inclined surface 2323, the light may be refracted again, and may not be directly received by the camera 300.

In such process, the light may be refracted, dispersed, and diffusely reflected in various directions, and the camera 300 may stably film the entire interior of the drum 120.

FIG. 13 shows another embodiment capable of preventing the camera 300 of the laundry treating apparatus according to the present disclosure from directly filming the lighting fixture 400 or from directly receiving the reflected light.

The drum 120 may be disposed such that the drum rear surface 122 is inclined with the inlet 112 or the outer panel 210.

In this connection, the internal lighting fixture 410 may be disposed not only in the first region I, but also in the second region II.

The internal lighting fixture 410 disposed in the first region I may be subjected to the same process as described above. The light irradiated from the internal lighting fixture 410 disposed in the second region II may move along the direction No. 2 and may be blocked from being directly reflected to the camera 300.

In other words, even when the light irradiated from the internal lighting fixture 410 passes through the concave surface 2322 and collides with the drum rear surface 122, because the drum rear surface 122 is disposed to be inclined, the light is reflected in a direction opposite to the direction in which the light is irradiated to the drum rear surface 122 based on a direction perpendicular to the drum rear surface 122. Accordingly, the light that has collided with the drum rear surface 122 may be diffusely reflected and dispersed on the drum body 121.

In addition, because the direction in which the light is reflected from the drum rear surface 1220 is not a direction toward the camera 300, the camera 300 may be prevented from directly receiving the light irradiated or reflected from the internal lighting fixture 410.

FIG. 14 shows another embodiment of a lighting fixture of a laundry treating apparatus according to the present disclosure.

The lighting fixture 400 of the laundry treating apparatus according to the present disclosure may include an external lighting fixture 420 disposed outwardly of the door 200.

The external lighting fixture 420 may be formed as a light bulb, a LED, and the like, and may be formed as a bar type or tape type light bulb as shown in (a) in FIG. 14.

As shown in (b) in FIG. 14, the external lighting fixture 420 should irradiate the light into the drum 120 and should be prevented from being blocked by the water or the laundry of the tub 110. In this connection, because a component that does not rotate around the inlet 112 is the gasket 113, the external lighting fixture 420 is preferably disposed on the gasket 113.

The external lighting fixture 420 may be disposed along at least a portion of a circumference of the gasket 113. The external lighting fixture 420 may be disposed on an inner surface of the gasket 113 to irradiate light to the entire interior of the drum 120. In addition, the external lighting fixture 420 may be disposed on an outer surface of the gasket 113 to add aesthetics.

In one example, the external lighting fixture 420 may be disposed anywhere as long as the external lighting fixture 420 may be disposed outside the angle of view of the camera 300.

FIG. 15 shows an embodiment in which the external lighting fixture 420 is disposed.

The external lighting fixture 420 may be disposed outside the door 200. The external lighting fixture 420 may be provided such that light is not directly irradiated to the camera 300 installed inside the door 200.

For example, when the external lighting fixture 420 is disposed above the camera 300, a light beam having the most downwardly inclined irradiation direction irradiated from the external lighting fixture 420 may be set to move toward a region located at the rear of the lens 320 of the camera 300 (or a region directed in a direction toward the drum). That is, the light irradiated downward from the external lighting fixture 420 may only pass through the inclined surface 2323 and the protruding surface 2321, but may not reach the camera 300.

That is, the external lighting fixture 420 may be located at the front of the angle of view of the camera 300 (in a direction of the outer panel), and may be located at the rear of the lens 320 of the camera 300 (in a direction of the drum).

For example, when the external lighting fixture 420 is disposed on the gasket 113, the camera 300 may be disposed closer to the outer panel 210 than the gasket 113 and the external lighting fixture 420 may be disposed to be spaced apart from the camera 300 toward the drum rear surface 122 or to a rearward direction.

When the light irradiated to the external lighting fixture 420 is irradiated to the inner panel 230, the light may be refracted or diffusely reflected on the inclined surface 2323 and may also be refracted or diffusely reflected on the protruding surface 2321.

In addition, because the external lighting fixture 420 irradiates the light at an angle with surfaces of the drum rear surface 122 and the drum body 121, the light reflected from the drum rear surface 122 and the drum body 121 may be diffusely reflected and may be prevented from being directly received by the camera 300.

Accordingly, when the external lighting fixture 420 is placed in a region outside the angle of view of the camera 300, the camera 300 may completely film the interior of the drum 120 without being affected by the external lighting fixture 420.

FIG. 16 shows another embodiment of the external lighting fixture 420.

The drum 120 may be disposed such that the drum rear surface 122 is inclined with respect to the outer panel 210. In this case, when the light irradiated to the outer panel 210 collides with the drum rear surface 122, the light may be reflected several times and may be diffusely reflected to be received by the camera 300.

Therefore, the interior of the drum 120 may be filmed more effectively with the camera 300.

In one example, in all the embodiments described above, the surface of the drum rear surface 122 and the inner surface of the drum body 121 may be provided to generate the diffused reflection. For example, the surface of the drum rear surface 122 and the inner surface of the drum body 121 may be rough or may be inclined in various directions.

Alternatively, the surface of the drum rear surface 122 and the inner surface of the drum body 121 may be made of a material having a very poor ability to reflect light. That is, the surface of the drum rear surface 122 and the inner surface of the drum body 121 may be subjected to a surface treatment to become cloudy.

Accordingly, the camera 300 may film the entire interior of the drum 120 without receiving the light that is irradiated from the lighting fixture 400 or that is directly reflected.

FIG. 17 shows an embodiment capable of increasing identifiability of the image of the camera 300.

The inner panel 230 directly collides with or comes into contact with water or detergent as well as the laundry. Accordingly, foreign substances such as water stains, stains, lint, and the like may be easily attached to an outer surface of the inner panel 230.

In this connection, when the camera 300 films the interior of the drum 120, due to the foreign substances attached to the outer surface of the inner panel 230, resolution of the image may be lowered or the laundry may not be properly identified.

Accordingly, the laundry treating apparatus according to the present disclosure may further include a wiper 270 that removes the foreign substances attached to an outer wall of the inner panel 230.

The wiper 270 may include a coupling hinge 271 coupled to the door frame 220, and a foreign substance removing portion 272 pivotably disposed on the coupling hinge 271. The coupling hinge 271 may be provided such that the foreign substance removing portion 272 reciprocally pivots a distance with a cleaning angle E corresponding to or greater than a diameter of the lens 320 by an actuator disposed inside the door frame 220.

The coupling hinge 271 may be disposed at an upper portion of the door frame 220. Accordingly, a frequency or the number of times that the wiper 270 directly contacts the laundry and the like may be greatly reduced.

The foreign substance removing portion 272 may be formed from the coupling hinge 271 in a shape of a bar having a length greater than a length of the lens 320, and a cleaning bristle, a rubber plate, or the like may be attached to a portion of the foreign substance removing portion 272 facing the inner panel 230 to sweep away the foreign substances.

The wiper 270 may be provided to operate immediately before the camera 300 operates, or may be provided to operate when the entire washing process is terminated. For example, the wiper 270 may be provided to operate when the operation of the driver is completely terminated.

FIG. 18 shows another embodiment capable of increasing the identifiability of the image of the camera 300.

The laundry treating apparatus according to the present disclosure may further include a cleaning assembly 500 capable of cleaning the inner panel 230.

The cleaning assembly 500 may include a spray nozzle 510 in communication with the water supply 140 or the drainage 150 to be able to spray water to the exterior of the inner panel 230.

The spray nozzle 510 may be controlled to spray water before the camera 300 is driven, or to spray water when the washing process is terminated. For example, the spray nozzle 510 may be controlled to spray water when the operation of the driver is completely terminated.

The spray nozzle 510 may be distinguished based on which water is supplied.

For example, the spray nozzle 510 may include at least one of a water supply nozzle 510a extending from the water supply valve 141 to the gasket 113 or branching from the water supply pipe 141 and extending to the gasket 113, and a drain nozzle 510b extending from the drain pump 152 or the circulator 87 to the gasket 113.

The cleaning assembly 500 may further include a spray pipe 520 provided to supply water to the spray nozzle 510.

The spray pipe 520 may include a water supply spray pipe 521 extending from the water supply valve 141 to the water supply nozzle 510a, and a circulating spray pipe 522 extending from the drain pump or a sprayer to the drain nozzle.

The water supply nozzle 510a may include a plurality of water supply nozzles spaced apart from each other along the circumference of the gasket 113.

In addition, the drain nozzle 510b may include a plurality of drain nozzles spaced apart from each other along the circumference of the gasket 113.

In this connection, the water supply nozzle 510a may be controlled to supply water the whole time. However, the drain nozzle 510b may be controlled to supply water during a final rinsing process. This is to prevent spraying of contaminated water to the inner panel 230.

In one example, the spray nozzle 510 may be distinguished based on a location thereof.

FIG. 19 shows that the spray nozzle 510 is distinguished based on the location thereof.

The spray nozzle 510 may include at least one of a first nozzle 511 that sprays water toward a top of the inner panel 230, a second nozzle 512 that sprays water toward one side surface of the inner panel 230, and a third nozzle 513 that sprays water toward the other side surface of the inner panel 230.

At least one of the first nozzle 511, the second nozzle 512, and the third nozzle 513 may be formed as the water supply nozzle 510a, and at least one thereof may be formed as the drain nozzle 510b.

For example, the first nozzle 511 may be formed as the water supply nozzle 510a, and the second nozzle 512 and the third nozzle 513 may be formed as the drain nozzle 510b.

Accordingly, water may be sprayed through the first nozzle 511 at the beginning of the washing course, such as laundry amount sensing, and water may be sprayed through the second nozzle 512 and the third nozzle 513 in the washing and rinsing operations.

In a dehydration operation, water may be sprayed through the first nozzle 511 to block exposure of the laundry to the foreign substances.

When the washing course is completely terminated and the operation of the driver is terminated, water may be sprayed through the first nozzle 511 to induce a clear image to be obtained when the image is filmed with the camera 300.

In one example, the first nozzle 511, the second nozzle 512, and the third nozzle 513 may be set to have the same spray amount or spray speed of water, or may be set to have different spray amounts or spray speeds of water.

For example, because the first nozzle 511 sprays water toward the top of the inner panel 230, the first nozzle 511 may be provided to separate the foreign substances attached to the inner panel 230 as the spray amount or the spray speed is set to be great or high for the first nozzle 511. In addition, because the second nozzle 512 or the third nozzle 513 sprays water toward the side surfaces of the inner panel 230, the second nozzle 512 or the third nozzle 513 may be provided to remove bubbles attached to the inner panel 230.

The first nozzle 511, the second nozzle 512, and the third nozzle 513 may be provided to spray water toward the camera 300.

As a result, because of the cleaning assembly 500, the camera 300 may completely film the interior of the drum 120 without being affected by a surface state of the inner panel 230.

FIG. 20 shows an embodiment for blocking the camera 300 from being exposed to moisture.

Because the camera 300 is an electronic product, the camera 300 may be vulnerable to the moisture. Because the door 200 is a component that is always in contact with water, there is a problem that a performance of the camera 300 is not always guaranteed.

For example, water may be brought into contact with the inner panel 230 and be introduced into a space between the inner panel 230 and the outer panel 210. In addition, there is a problem in that the water leaked or introduced into the space between the inner panel 230 and the outer panel 210 may evaporate and damage an internal circuit of the camera 300.

In the laundry treating apparatus according to the present disclosure, in order to prevent this, the door frame 220 may be provided to seal the outer panel 210 and the inner panel 230. Accordingly, it is possible to prevent the water from flowing into the space between the outer panel 210 and the inner panel 230.

Specifically, the door frame 220 may be provided to accommodate and seal both the outer circumferential surfaces of the outer panel 210 and the inner panel 230.

The door frame 220 may include a sealing body 221 disposed on the outer circumferential surfaces of the outer panel 210 and the inner panel 230, a first coupling portion 251 extending from the sealing body 221 to an outer surface of the inner panel 230, and a second coupling portion 252 extending from the sealing body 221 to an outer surface of the outer panel 210.

The sealing body 221, the [second] first coupling portion 251, and the second coupling portion 252 may have a c-shaped cross-section, and may be provided to bring the outer circumferential surfaces of the inner panel 230 and the outer panel 210 into close contact with each other.

An adhesive or a sealing agent may be further applied between each of the sealing body 221, the first coupling portion 251, and the second coupling portion 252 and each of the inner panel 230 and the outer panel 210.

Accordingly, it is possible to block the water of the tub 110 from flowing into the space between the inner panel 230 and the outer panel 210.

In one example, when the water is temporarily or accidentally introduced into the space between the outer panel 210 and the inner panel 230, it is necessary to discharge the water w to the outside. In addition, even when the water is not introduced into the space between the outer panel 210 and the inner panel 230, the camera 300 may be affected by a change in internal relative humidity.

To this end, the laundry treating apparatus according to the present disclosure may further include a ventilation hole 260 penetrating the outer panel 210. The exterior of the outer panel 210 and the space between the outer panel 210 and the inner panel 230 may communicate with each other through the ventilation hole 260. Accordingly, the water introduced into the space between the outer panel 210 and the inner panel 230 may be naturally discharged or evaporated directly through the ventilation hole 260. In addition, when the relative humidity of the space between the outer panel 210 and the inner panel 230 increases, the humidity may naturally match that of the external environment.

Accordingly, it is possible to prevent the camera 300 from being damaged by the moisture or the like.

Figure 21:
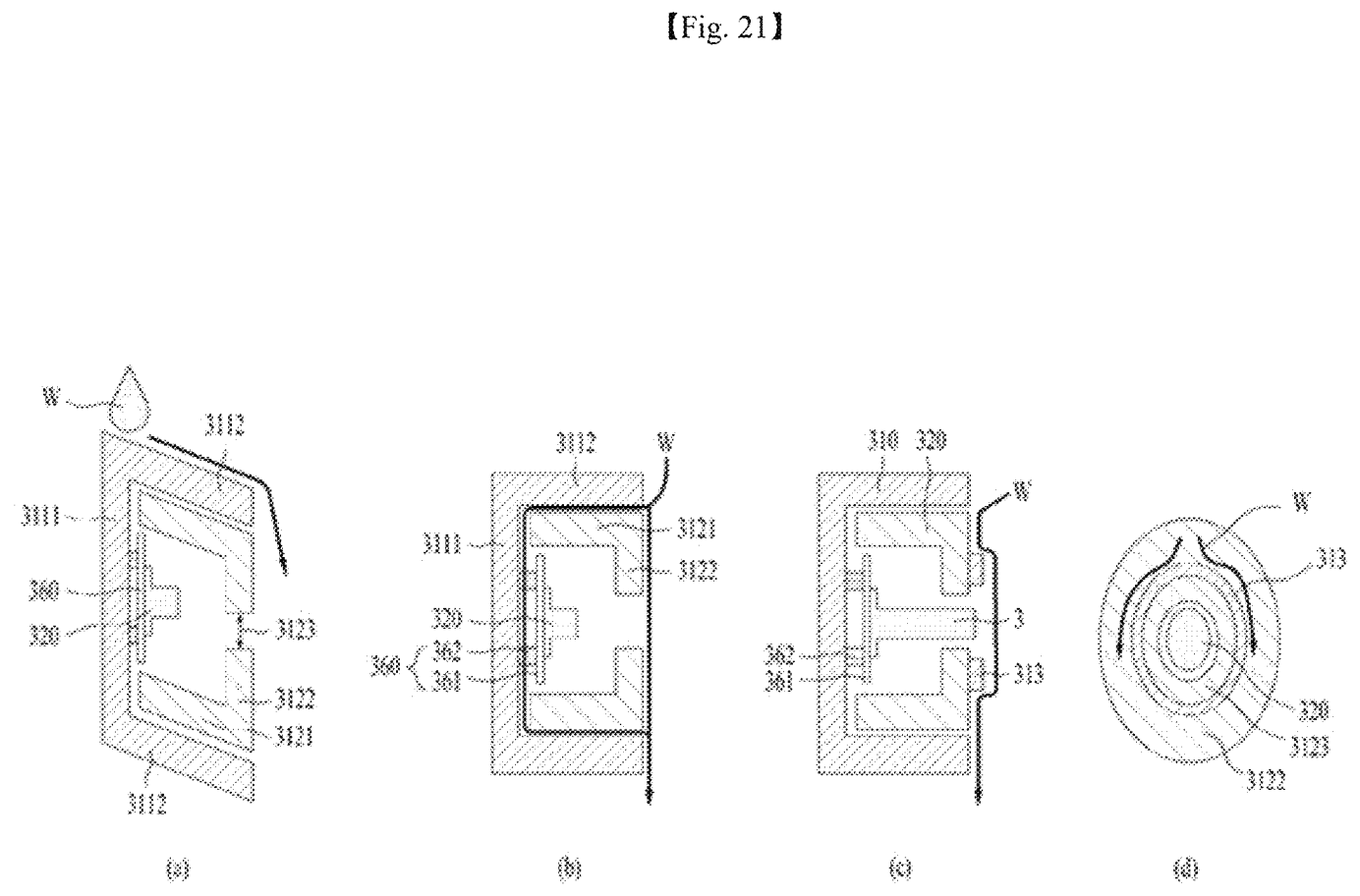

FIG. 21 shows an embodiment in which the camera 300 itself may have an ability to avoid the introduced water.

Referring to (a) in FIG. 21, the camera 300 may be provided to induce the water to flow out of the casing 310 as soon as the camera 300 comes into contact with the water to prevent the water from flowing into the casing 310.

Typically, because the camera 300 is disposed to be coupled to the outer panel 210, and is spaced apart from a lower end of the door frame 220, it is unlikely that a lower portion of the camera 300 will be in contact with the water, and even when water comes into contact with the lower portion of the camera 300, the water is not able to enter the casing 310 by an own weight thereof and is able to be immediately separated from the casing 310 again.

However, when the water introduced between top surfaces of the outer panel 210 and the inner panel 230 comes into contact with a top surface of the camera 300, the water may invade into the casing 310 while staying on the top surface of the casing 310 for a predetermined time.

Accordingly, the casing 310 may be disposed such that a top surface thereof is inclined downwardly. When the casing 310 is fixed to the outer panel 210, the top surface of the casing 310 may be inclined downwardly in a direction away from the outer panel 210. Accordingly, the water introduced to the top surface of the casing 310 may be separated from the casing 310 along an inclination of the top surface of the casing 310.

The casing 310 may include an outer casing 311 for accommodating the lens 320 therein and protecting the lens 320.

The outer casing 311 may include a fixed body 3111 coupled to and fixed to the outer panel 210, and an accommodating body 3112 extending from the fixed body 3111 toward the inner panel 230 to accommodate the lens 320 therein.

The accommodating body 3112 may be disposed to be inclined downwardly from the fixed body 3111 toward the inner panel 230. In this connection, only a top surface of the accommodating body 3112 may be inclined downwardly, or a bottom surface of the accommodating body 3112 may also be inclined downwardly. As a result, even water in contact with the bottom surface of the accommodating body 3112 may be immediately discharged from the casing 310 by flowing along the bottom surface of the accommodating body 3112.

The lens 320 may be fixed to an inner wall of the accommodating body 3112. The camera 300 may include a fixing assembly 360 that couples the lens 320 to the fixed body 3111. The fixing assembly 360 may be formed in a shape of a panel coupled to the lens 320. The fixing assembly 360 may include a photo controller that controls the lens 320 and records or edits the image filmed by the lens 320.

The casing 310 may further include an inner casing 312 for accommodating the lens 320 inside the outer casing 311.

The inner casing 312 may include a support body 3121 that is seated or supported on the accommodating body 3112 and accommodates the lens 320 therein, a blocking body 3122 that is disposed on the support body 3121 to block the lens 320 or the fixing assembly 360 from being exposed to the outside, and a light receiving portion 3123 that passes through the blocking body 3122 and collects light to the lens 320.

The light receiving portion 3123 may penetrate the blocking body 3122 at a vertical level corresponding to that of the lens 320 or facing the lens 320.

In other words, the outer casing 311 may be provided as a housing whose one surface is opened toward the inner panel 230, and the inner casing 312 may be provided as a housing whose one surface is opened toward the outer panel 210.

The support body 3121 may extend from the blocking body 3122 at an inclination corresponding to that of the accommodating body 3112.

Accordingly, the water introduced to the space between the support body 3121 and the accommodating body 3112 may not be able to flow to the fixing assembly 360 and may escape toward the blocking body 3122 or the exterior of the casing 310.

In addition, the blocking body 3122 may block water introduced toward the lens 320 or water flowing along the accommodating body 3112 from flowing into the lens 320.

(b) in FIG. 21 shows another embodiment of the camera.

The casing 310 of the camera 300 may include the outer casing 311 and the inner casing 312 in the same manner as in the above-described embodiment. In this connection, the accommodating body 3112 and the blocking body 3122 may be inclined as in the above-described embodiment, and may be disposed perpendicular to the fixed body 3111 as shown in the drawing.

The fixing assembly 360 may be provided to separate the lens 320 from the fixed body 3111. Specifically, the fixing assembly 360 may include a fixing panel 361 that supports the lens 320 and is coupled to the lens 320, and a fixing rib 362 that separates the fixing panel 361 from the fixed body 3111. The fixed panel 361 may be formed as a PCB panel that controls the lens 320.

Accordingly, the water W introduced into the space between the outer casing 311 and the inner casing 312 may pass the fixing rib 362 and then be discharged to the outside of the casing 310 again. In this connection, the fixed rib 362 separates the lens 320 and the fixed panel 361 from the fixed body 3111, thereby preventing the water W from contacting the lens 320 and the fixing panel 361.

(c) in FIG. 21 shows another embodiment of the camera, and (d) in FIG. 21 shows the camera in (c) in FIG. 21 viewed from the front.

A structure in (c) in FIG. 21 may be substantially the same as that in (b) in FIG. 21. In this connection, the inner casing 312 may include a moisture inducing portion 313 protruding from the blocking body 3122 toward the inner panel 230. The moisture inducing portion 313 may protrude from a portion above the light receiving portion 3123 to be spaced apart from the light receiving portion 3123. Accordingly, water flowing from the portion above the light receiving portion 3123 toward the light receiving portion 3123 may be blocked by the water inducing portion 313 and prevented from flowing into the light receiving portion 3123. It may be seen that the moisture inducing portion 313 performs the same function as eyebrows.

In this connection, the moisture inducing portion 313 may protrude in a shape of a bar on top of the light receiving portion 3123, but may protrude along an outer circumferential surface of the light receiving portion 3123 as shown, and may be disposed on top of the light receiving portion 3123 in a shape of an arc that is downwardly convex.

That is, the moisture inducing portion 313 may be formed in any shape as long as it may flow the water out of the light receiving portion 3123 without collecting the water.

FIG. 22 shows an embodiment in which the laundry treating apparatus according to the present disclosure may sense the volume of the laundry through one camera 300.

When the laundry is located inside the drum 120 as shown in (a) in FIG. 22, the camera 300 may acquire the image by filming the laundry once.

Thereafter, as shown in (b) in FIG. 22, the main controller may rotate the drum 120 at a predetermined angle by driving the motor. Thereafter, the camera 300 may acquire the image again by filming the laundry once again.

As a result, the camera 300 may derive the same effect as filming the laundry at different angles by filming the laundry twice by rotating the laundry.

Therefore, the photo controller 360 may identify the laundry three-dimensionally by synthesizing the images. That is, the photo controller 360 may obtain a three-dimensional image by processing the image of the laundry filmed once, and the image filmed once again after changing the angle by rotating the laundry.

This is the same as the principle that human eyes identify an object to identify a distance and a volume of the object.

That is, although the camera 300 is a monocular camera with one filming aperture, the camera 300 may exhibit the same effect of filming with a binocular camera with two filming apertures by synthesizing the images filmed twice by changing a location of the object.

In other words, (b) in FIG. 22 may be regarded as an image filmed with a left lens or a left camera, and (a) in FIG. 22 may be regarded as an image filmed with a right lens or a right camera.

Thus, the photo controller 360 may easily identify the shape and the volume of the laundry through the monocular camera.

In this connection, the rotation angle of the drum 120 may be less than 360 degrees. Preferably, the rotation angle is preferably less than 90 degrees such that the shape of the laundry does not change.

This is because, when the laundry rotates by an angle equal to or greater than 90 degrees, it is not possible to acquire the accurate three-dimensional image of the laundry because the images of the laundry filmed twice change as the laundry may be deviated from an inner circumferential surface of the drum 120 by gravity and may fall, or the shape of the laundry may be changed.

The photo controller 360 may identify the three-dimensional shape of the laundry through the filming technique.

However, because the images only provide the three-dimensional shape of the laundry, and do not provide accurate dimensions, the photo controller 360 needs to identify exactly what volume value the three-dimensional shape of the laundry has.

To this end, the photo controller 360 may measure a distance between the lens 320 of the camera 300 and each point of the laundry to prepare a reference value for measuring the exact volume of the laundry. In addition, the photo controller 360 may identify exact size and volume of the laundry using the camera 300, the distance to each point of the laundry, the rotation angle of the drum 120, and a radius of the drum 120.

Hereinafter, a specific embodiment regarding the above-mentioned volumetric measurement will be described.

The lens 320 of the camera 300 may have a constant magnification and a focal length, and information on the lens 320 may be stored in advance in the photo controller 360.

The laundry may be filmed through the camera 300, and the filmed image may be focused on the lens 320.

In this connection, the photo controller 360 may calculate a length and an area of the image focused on the lens 320, and calculate actual length and area of the laundry through magnification of the lens.

Thus, it is possible to accurately identify the volume of the laundry.

Using such method, it is sufficient to film the laundry twice with one camera without the need to continuously film the laundry, and it is possible to calculate the actual volume of the laundry by synthesizing only the images filmed twice.

FIG. 23 shows another embodiment in which the laundry treating apparatus according to the present disclosure may sense the volume of the laundry through one camera 300.

Referring to (a) in FIG. 23, the photo controller 360 may store image information obtained by filming, by the camera 300, the interior of the drum 120 when the drum 120 is empty in advance.

In addition, the photo controller 360 may identify the number of through holes inside the drum 120 and store the number of through holes in advance. Thereafter, when the laundry is input, the camera 300 may film the interior of the drum 120 once.

(b) in FIG. 23 shows that a relatively small volume of laundry is accommodated inside the drum 120, and (c) in FIG. 23 shows that a relatively large volume of laundry is accommodated inside the drum 120.

In this connection, the controller 360 may measure the volume of the laundry by identifying the number of through holes 51 exposed inside the drum 120 in which the laundry is accommodated. That is, the photo controller 360 may identify an exposed portion of a rotation center of the drum 120 and an exposed portion of the inner circumferential surface of the drum 120 with the number of through holes to calculate the volume of the laundry by identifying an area and a height of the laundry.

In addition, the photo controller 360 may also calculate a volume occupied by a region where the laundry exists by separating the region with the laundry and a region without the laundry from each other in the image through the image information filmed when the drum is empty and the image information obtained by filming the laundry.

As a result, the laundry treating apparatus according to the present disclosure may borrow any method that may sense the volume of the laundry by filming the interior of the drum 120 through the camera 300.

FIG. 24 shows an embodiment of a control method in which the laundry treating apparatus according to the present disclosure accurately senses the volume of the laundry.

The laundry treating apparatus according to the present disclosure may sense the volume of the laundry in order to accurately sense the amount of laundry. For example, a water level required for the washing process may be determined by sensing an amount of dry laundry, and a time for performing a dehydration process and a rotational speed of the drum may be determined by sensing an amount of wet laundry.

In addition, the laundry treating apparatus according to the present disclosure may sense the volume of the laundry in order to sense the fabric of the laundry. For example, in a case of laundry of soft fabric, it is possible to protect the laundry by lowering the RPM of the drum during the washing process, the rinsing process, and the dehydration process. In addition, in a case of laundry of strong fabric, the RPM of the drum may be increased on the contrary.

In this connection, in order to accurately sense the amount or the fabric of the laundry, it is essential to accurately sense the volume of the laundry. Therefore, the laundry treating apparatus according to the present disclosure may use the rotation of the drum and the camera at the same time to accurately sense the volume of the laundry.

The laundry treating apparatus according to the present disclosure may perform a first rotating operation S1 of rotating the drum by controlling the driver 130 before sensing the volume of the laundry.

Thus, even when the user puts the laundry into the drum 120 by compressing the laundry, the laundry may be uncompressed by the rotation of the drum. In addition, even when the laundry is twisted or agglomerated, the laundry may be agitated and untangled to have an original volume thereof.

To this end, it is preferable that a drum rotation speed of the first rotating operation S1 is lower than a speed at which the laundry may perform one rotation by sticking to an inner wall of the drum. As a result, as the laundry rises and then falls, the laundry is untangled and becomes to have the original volume thereof. For example, the drum may be rotated at a speed at which the laundry rises and falls within a range of angle between 90 and 180 degrees.

When the first rotating operation S1 is terminated, it is possible to perform a first filming operation S2 of filming the interior of the drum 120 with the camera 300, and analyzing the image to sense the volume of the laundry accommodated in the drum 120.

In the first filming operation S2, the photo controller 360 or the main controller may calculate the volume of the laundry in the various methods described above through the filmed image.

The laundry treating apparatus according to the present disclosure may perform a procedure of additionally identifying whether the calculated volume is correct before finalizing the volume calculated through the first filming operation S2 as a final volume.

That is, because the laundry treating apparatus according to the present disclosure indirectly measures the volume through the image acquired in the first filming operation S2, a procedure for additionally identifying the volume may be further performed in consideration of a possibility that the volume is inaccurate. Accordingly, it is possible to accurately recognize the fabric or the material of the laundry in the future by accurately sensing the volume of the laundry.

For example, the laundry treating apparatus according to the present disclosure may re-measure the volume of the laundry through re-filming and compare a value obtained by re-measuring the volume with the previously measured value to identify the volume of the laundry. However, in the case of the simple re-filming, there is room for the measured value to be the same. Thus, the volume of the laundry may be measured after changing a position or a shape of the laundry by rotating the drum additionally before the re-filming.

Specifically, the laundry treating apparatus according to the present disclosure may perform a second rotating operation S4 of rotating the drum again after the first filming operation S2 is terminated, and then, perform a second filming operation S5 of filming the interior of the drum 120.

In the second rotating operation S4, at least one of the rotation speed, the rotation direction, and the total number of rotations of the drum may be set differently from that in the first rotating operation S1. As a result, the laundry may be further agitated, and be disposed in the drum 120 while restoring the original volume thereof.

It is possible to calculate the volume of the laundry again through the image obtained in the second filming operation S5.

The laundry treating apparatus according to the present disclosure may perform an identifying operation S6 of sensing a difference in the volumes respectively calculated in the first filming operation and the second filming operation.

When a deviation of the volume values in the identifying operation S6 is equal to or smaller than an allowable value, it may be determined that the volume of the laundry is accurately sensed. Accordingly, the laundry treating apparatus according to the present disclosure may perform a finalizing operation S9 of finalizing the volume of the laundry.

The allowable value may be varied based on the volume of the laundry. For example, 10% of the largest value of the measured laundry volumes may be set as the allowable value.

Alternatively, the allowable value may be determined as a size of a specific laundry. For example, the allowable value may correspond to a volume of 5 towels or a typical volume value of 1 pair of jeans.

The finalizing operation S9 may finalize one of the volume calculated in the first filming operation S2 and the volume calculated in the second filming operation S5 as the final volume of the laundry. In this connection, because the second filming operation S5 was performed after more agitating the laundry, the controller may finalize the volume calculated through the image of the second filming operation S5 as the final volume.

In addition, the controller may finalize an average value of the volume calculated in the first filming operation S2 and the volume calculated in the second filming operation S5 as the final volume or may finalize the final volume by varying a weight.

In one example, when the deviation of the volume values in the identifying operation S6 exceeds the allowable value, it may mean that the laundry is agglomerated or twisted.

Accordingly, the laundry treating apparatus according to the present disclosure may perform a third rotating operation S7 of rotating the drum again.

In the third rotating operation S7, at least one of the number of rotations, the rotation speed, the rotation time, and the rotation direction of the drum may be set differently from that in the second rotating operation S4. For example, the number of rotations, the rotation speed, and the rotation time of the drum may be set greater, higher, and longer, and the rotation direction may be set differently. In addition, the rotation direction may be changed one or more times. Accordingly, the agglomeration or the twisting of the laundry may be resolved by agitating the laundry in the third rotating operation S7.

The laundry treating apparatus according to the present disclosure may perform a third filming operation S8 of filming the drum 120 again. The controller may calculate the volume of the laundry again through an image obtained in the third filming operation S8.

The finalizing operation S9 may finalize the volume calculated in the third filming operation S8 as the final volume. Because the volumes calculated in the first and second filming operations are not accurate, only the volume calculated in the third filming operation may be finalized as the final volume.

In one example, the volume obtained in the third filming operation S8 and the previously calculated volume may be compared to each other again. However, in order to prevent washing delay, it is preferable to determine the volume calculated in the third filming operation S8 as the final volume.

In one example, the laundry treating apparatus according to the present disclosure may further perform an inspection operation S3 of identifying whether the volume value of the laundry or a filming region calculated from the image filmed in the first filming operation S2 is between the reference value and a specific value.

In this connection, the filming region may be a filming region of the laundry, and may be a region in which the laundry is excluded from the inner surface of the drum.

When the volume value calculated in the inspection operation S3 is between the reference value and the specific value, one or more of the second rotating operation S4 and the second filming operation S5 may be performed.

The reference value may be a value at which the volume of the laundry starts to not change significantly even when the laundry is agitated because of the small volume of the laundry. That is, when the amount of laundry is very small, even when the drum is rotated again, the volume of the laundry does not change significantly, so that the volume of the laundry may be determined with just one filming. Thus, the washing delay or the like may be prevented.

The reference value may be set to a volume at which at least a portion of a front portion and a rear portion of the bottom surface of the drum starts to be seen. For example, when the laundry is socks, towels, underwear, or the like, and is disposed in a very small amount, even when the laundry is disposed in the drum, the laundry is not able to cover the entire front portion or rear portion of the drum. In this case, there is no possibility that the laundry will be twisted or compressed, and there is no meaning even when the laundry is agglomerated, so that the volume of the laundry may be finalized with only one filming.

When the drum 120 has a plurality of lifters protruding from the drum body to raise the laundry therein, the reference value may correspond to an area or a volume from one lifter to another lifter along the lower portion of the drum.

In one example, the specific value may be set to a value for a situation in which it is difficult to agitate the laundry even when the drum is rotated as the laundry is almost completely filled inside the drum. In other words, the interior of the drum may be filled with the laundry to such an extent that the drum rear surface is not able to be identified by the camera 300, or a cotton-wool duvet, a padded jacket, or multiple laundry may be filled in the drum at once. For example, the specific value may be set to an area to which only ⅕ of the drum rear surface is exposed or a volume corresponding thereto.

In this case, even when the drum is rotated, the state of the laundry may not change. The specific value may be a value at which the volume of the laundry starts to not change significantly even when the laundry is agitated because of the large volume of the laundry. When the amount of laundry is great, even when the drum is rotated again, the volume of the laundry does not change significantly, so that the volume of the laundry may be finalized with just one filming. Thus, the washing delay and the like may be prevented.

As a result, when the volume value, the filming region, or the like calculated in the inspection operation S3 is smaller than this reference value or larger than the specific value, the second rotating operation S4 or the second filming operation S5 may be omitted and the finalizing operation S9 may be directly performed. That is, the volume value calculated in the first filming operation S2 may be finalized directly as the volume of the laundry.

In one example, unlike the above-described embodiment, the laundry treating apparatus according to the present disclosure may omit the first rotating operation S1 before performing the first filming operation S2.

That is, the volume of the laundry may be sensed without rotating the drum, then the volume of the laundry may be sensed after rotating the drum, and then, the identifying operation S6 of identifying the difference between the respective volume values may be performed. Depending on whether the difference in the volume value is greater than the allowable value, the finalizing operation S9 may be directly performed or the third rotating operation S7 may be performed.

As a result, the laundry treating apparatus according to the present disclosure may finalize the final volume by performing the filming once, then performing the filming again after rotating the drum, and then, performing the inspection of the volume.

FIG. 25 shows characteristics based on a type of laundry.

In general, the laundry may be classified into laundry of a duvet region in which a heat dissipation material, a cushioning material, and the like are separately filled inside an outer cover, such as the duvet, the padded jacket, or the like, and laundry of a general laundry region in which the separate material is not filled inside the outer cover.

In this connection, a weight compared to a volume of the laundry of the duvet region may be smaller than that of the laundry of the general region. In addition, a large amount of laundry may be put into a laundry net, or a single shirt or towel may have a very small volume.

Using such characteristics, the laundry treating apparatus according to the present disclosure may classify types of laundry by checking the volume and the weight of the laundry. That is, data for the region corresponding to that in FIG. 27 may be stored in the controller, and the type of the laundry inside the drum may be classified by sensing the weight of the laundry and the volume of the laundry.

Specifically, the controller may classify the type of the laundry by examining which region the laundry belongs to by sensing the weight of the laundry through a load applied to the driver or a load output by the driver while rotating or stopping the rotation of the drum, and sensing the weight of the laundry by filming an appearance of the laundry with the camera.

For example, it is possible to primarily classify whether the laundry in the drum is the laundry in the duvet region or the laundry in the general laundry region.

Because the laundry in the duvet region contains a large amount of moisture due to the heat dissipation material or the cushioning material inside, it is necessary to supply a larger amount of water to the laundry in the duvet region than to the laundry of the general region.

FIG. 26 shows characteristics related to a material of laundry.

The laundry of the general region without the separate heat dissipation material or cushioning material inside the outer cover is made with several fibers interwoven with each other. However, the volume change when water is contained may vary depending on a type of the fiber.

For example, when water is supplied in a state in which the general laundry is disposed, the laundry such as the towels and the jeans may absorb water to increase in the weight, but may not change in the volume significantly.

In addition, in a case of a wool fiber such as a sweater, when receiving water, the wool fiber may shrink in a process of increasing in the weight by absorbing water, so that a volume of the wool fiber may be greatly reduced.

In addition, general laundry, which is made of fiber intermediate between the wool fiber such as the sweater and the jeans fiber, may shrink relatively little while absorbing water, so that a weight of the general laundry may increase, but a volume thereof may decrease to a certain extent.

Therefore, the material of the laundry may be identified by sensing the change in the volume of the laundry when water is supplied to the laundry.

FIG. 27 shows an embodiment of a control method capable of identifying a type and a material of laundry.

The laundry treating apparatus according to the present disclosure may perform a drum rotating operation t1 of agitating the laundry by rotating the drum, and a volume sensing operation t2 of sensing the volume of the laundry by filming the interior of the drum 120.

When rotating or stopping the drum in the drum rotating operation t1, it is possible to sense the weight of the laundry by sensing a current applied to or output from the driver.

The control method of FIG. 24 may be applied to the drum rotating operation t1 and the volume sensing operation t2 as it is. For example, one of the first rotating operation S1, the second rotating operation S2, and the third rotating operation S3 may correspond to the drum rotating operation t1, and the finalizing operation S9 performed by utilizing at least one of the first filming operation S2, the second filming operation S5, and the third filming operation S8 may correspond to the volume sensing operation t2.

The controller 360 may perform a primary classification operation t3 of classifying the type of the laundry through the weight and the volume.

For example, whether the laundry is the laundry of the duvet region or whether the laundry is the laundry of the general region may be classified.

Thereafter, the laundry treating apparatus according to the present disclosure may perform a water supply operation t4 of supplying water to the tub 110 by driving the water supply 140.

The water supply operation t4, which induces the change in the volume of the laundry when the laundry is supplied with water, may be performed until just before a water level in the tub 110 is raised and a water surface is exposed to the drum 120. That is, the main controller may adjust a supply amount through the water supply 140 by controlling a water level sensor connected to the tub 110.

This is because, when the water level in the tub 110 is raised and the water surface is exposed to the interior of the drum 120, there is a fear that the camera 300 may mistakenly determine that a volume including a volume of water corresponding to the water level as the volume of the laundry.

Thereafter, the laundry treating apparatus according to the present disclosure may perform an additional volume sensing operation t6 of measuring the volume of the laundry with the camera 300. The additional volume sensing operation t6 may measure the change in the volume of the laundry with the camera 300 by re-filming the laundry accommodated inside the drum 120.

In this connection, the laundry treating apparatus according to the present disclosure may perform an additional rotating operation t5 of rotating the drum. The additional rotating operation t5 may induce the agitation of the laundry such that all water may be absorbed into the laundry.

In addition, the control method of FIG. 24 may be applied to the additional rotating operation t5 and the additional volume sensing operation t6 as it is. For example, one of the first rotating operation S1, the second rotating operation S2, and the third rotating operation S3 may correspond to the additional rotating operation t5, and the finalizing operation S9 performed by utilizing at least one of the first filming operation S2, the second filming operation S5, and the third filming operation S8 may correspond to the additional volume sensing operation t6.

The laundry treating apparatus according to the present disclosure may sense the change in the volume of the laundry to identify what material the laundry is made of. Because a change in the weight will be a weight of the supplied water, the change in the weight may not be considered significantly.

Accordingly, the laundry treating apparatus according to the present disclosure may accurately identify the material as well as the type of the laundry. Therefore, the laundry treating apparatus according to the present disclosure may recommend a customized washing course or option by utilizing the same, and may select a washing course or the like suitable for the laundry or may perform the washing course or the like in an adjusted manner.

The present disclosure may be modified in various forms and implemented, so that a scope thereof is not limited to the embodiment described above. Therefore, when the modified embodiment contains a component of the claims of the present disclosure, it should be viewed as belonging to the scope of the present disclosure.

The invention claimed is:

1. A method for controlling a laundry treating apparatus including a cabinet having an opening and defining a space to receive laundry therein, a door configured to open and close the opening, a drum disposed in the cabinet and configured to rotate the laundry, a driver coupled to the drum and configured to rotate the drum, a camera disposed in the opening or on the door and configured to film an interior of the drum, and a controller configured to control the driver and the camera and calculate a weight or a volume of the laundry, the method comprising:

performing a first rotating operation of rotating the drum to agitate the laundry;

performing a first filming operation of calculating the volume of the laundry through a first image obtained by filming the interior of the drum;

based on the volume calculated in the first filming operation, performing an inspection operation of determining whether the volume of the laundry calculated in the first filming operation is between a reference value and a predetermined value;

based on determining that the volume of the laundry calculated in the first filming operation is between the reference value and the predetermined value, (i) performing a second rotating operation of rotating the drum to agitate the laundry, (ii) performing a second filming operation of re-calculating the volume of the laundry through a second image obtained by filming the interior of the drum, and (iii) performing a finalizing operation of analyzing at least one of the first image and the second image to determine the volume of the laundry; and based on determining that the volume of the laundry calculated in the first filming operation is less than the reference value or greater than the predetermined value, omitting the second rotating operation and the second filming operation, and performing the finalizing operation of analyzing the first image to determine the volume of the laundry.

2. The method of claim 1, wherein a rotation direction of the drum is different in the first rotating operation and the second rotating operation.

3. The method of claim 1, wherein a number of rotations of the drum is different in the first rotating operation and the second rotating operation.

4. The method of claim 1, wherein the finalizing operation includes:

determining an average value of a first volume of the laundry calculated through the first image of the first filming operation and a second volume of the laundry calculated through the second image of the second filming operation as the volume of the laundry.

5. The method of claim 4, further comprising:

based on a difference between the first volume of the laundry and the second volume of the laundry being equal to or greater than a set value, (i) performing a third rotating operation of rotating the drum to agitate the laundry and (ii) performing a third filming operation of filming the interior of the drum to obtain a third image of the laundry.

6. The method of claim 5, wherein a rotation direction of the drum in the third rotating operation is different from a rotation direction of the drum in the second rotating operation.

7. The method of claim 5, wherein a number of rotations of the drum in the third rotating operation is greater than a number of rotations of the drum in the first rotating operation or the second rotating operation.

8. The method of claim 5, wherein the finalizing operation includes:

determining a volume of the laundry calculated through the third image of the third filming operation as the volume of the laundry.

9. The method of claim 1, wherein the drum includes:

a drum rear surface coupled to the driver; and a drum body extending from the drum rear surface to the opening and configured to accommodate the laundry therein, wherein the reference value is a volume of the laundry at which a bottom surface of the drum is exposed in the first image.

10. The method of claim 1, wherein the drum includes:

a drum rear surface coupled to the driver; and a drum body extending from the drum rear surface to the opening and configured to accommodate the laundry therein, wherein the predetermined value is a volume of the laundry at which exposure of the drum rear surface is blocked by the laundry in the first image.

11. The method of claim 1, further comprising:

performing an initial filming operation of filming the interior of the drum to obtain an initial image of the laundry before the first rotating operation;

based on a difference between an initial volume of the laundry calculated through the initial image of the initial filming operation and a first volume of the laundry calculated through the first image of the first filming operation being equal to or greater than a set value, performing the second rotating operation of rotating the drum to agitate the laundry after the first filming operation, and performing the second filming operation of filming the interior of the drum to obtain the second image of the laundry; and based on the difference between the initial volume of the laundry calculated through the initial image of the initial filming operation and the first volume of the laundry calculated through the first image of the first filming operation being equal to or smaller than the set value, determining an average value of the initial volume of the laundry and the first volume of the laundry as the volume of the laundry.

12. The method of claim 1, wherein the finalizing operation includes:

calculating the weight of the laundry in the first rotating operation and calculating the volume of the laundry in the first filming operation to identify a density of the laundry.

13. The method of claim 12, wherein the laundry treating apparatus further includes a tub configured to accommodate the drum therein, wherein the driver is coupled to the tub, and a water supply configured to supply water to the tub, wherein the method further includes:

performing a water supply operation of supplying water to the tub after the finalizing operation, performing the second filming operation of filming the interior of the drum to obtain the second image of the laundry, and performing a laundry identifying operation of sensing a change in the volume of the laundry through the second filming operation to sense a fabric of the laundry.

14. The method of claim 13, further comprising the second rotating operation of rotating the drum to agitate the laundry before the second filming operation.

15. The method of claim 13, wherein the water supply operation includes stopping the water supply operation based on a water level in the tub rising and a water surface being exposed to the drum.

\* \* \* \* \*